US012664412B2

(12) United States Patent
Vrudhula et al.

(10) Patent No.: US 12,664,412 B2
(45) Date of Patent: Jun. 23, 2026

(54) SYSTEM AND METHOD FOR IN-MEMORY IMAGE PROCESSING

(71) Applicants: Sarma Vrudhula, Chandler, AZ (US); Gian Singh, Tempe, AZ (US); Ayushi Dube, Tempe, AZ (US)

(72) Inventors: Sarma Vrudhula, Chandler, AZ (US); Gian Singh, Tempe, AZ (US); Ayushi Dube, Tempe, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

(21) Appl. No.: 18/743,059

(22) Filed: Jun. 13, 2024

(65) Prior Publication Data

US 2024/0419955 A1 Dec. 19, 2024

Related U.S. Application Data

(60) Provisional application No. 63/508,253, filed on Jun. 14, 2023.

(51) Int. Cl.
*G06N 3/063* (2023.01)
(52) U.S. Cl.
CPC .................................... *G06N 3/063* (2013.01)
(58) Field of Classification Search
CPC ....................................................... G06N 3/063
See application file for complete search history.

(56) References Cited

U.S. PATENT DOCUMENTS

| | | | | |
|---|---|---|---|---|
| 11,823,037 B1* | 11/2023 | Maslov | .................... | G06N 3/08 |
| 2012/0259804 A1* | 10/2012 | Brezzo | ................... | G06N 3/063 |
| | | | | 706/33 |
| 2018/0075344 A1* | 3/2018 | Ma | ........................ | G06N 3/063 |
| 2018/0373977 A1* | 12/2018 | Carbon | ................. | G06N 3/048 |
| 2021/0295134 A1* | 9/2021 | Stevens | ............... | G06F 7/49973 |
| 2022/0239924 A1* | 7/2022 | Kirchhoffer | ........... | H04N 19/46 |

(Continued)

OTHER PUBLICATIONS

"File: Original lena512.jpg", MediaWiki, 2016, 2 pages, Retrieved from website: http://boofcv.org/index.php?title=File:Original_lena512.jpg&oldid=2014.

(Continued)

*Primary Examiner* — Michelle T Bechtold
*Assistant Examiner* — Moriam Mosunmola Godo
(74) *Attorney, Agent, or Firm* — Womble Bond Dickinson (US) LLP

(57) ABSTRACT

A system and method for in-memory image processing. In some embodiments, a system includes a memory, a first neuron processing circuit, and a second neuron processing circuit. The first neuron processing circuit may be connected to a first plurality of bit lines of the memory, and the second neuron processing circuit may be connected to a second plurality of bit lines of the memory. The first neuron processing circuit may include a plurality of configurable processing circuits, each of the configurable processing circuits including: an artificial neuron for calculating the sign of a weighted sum of a plurality of single-bit digital input signals at respective inputs of the artificial neuron, and a plurality of multiplexers, each having an output connected to a respective input of the inputs of the artificial neuron.

20 Claims, 16 Drawing Sheets

(56) References Cited

U.S. PATENT DOCUMENTS

| | | | | |
|---|---|---|---|---|
| 2023/0280976 A1* | 9/2023 | Khwa | | G06F 7/5443 |
| | | | | 708/670 |
| 2023/0325645 A1* | 10/2023 | Tran | | G06N 3/063 |
| | | | | 706/15 |

OTHER PUBLICATIONS

Al-Maaitah, K. et al., "Configurable-Accuracy Approximate Adder Design with Light-Weight Fast Convergence Error Recovery Circuit", 2017 IEEE Jordan Conference on Applied Electrical Engineering and Computing Technologies (AEECT), 2017, 6 pages.

Anusha, G. et al., "Design of approximate adders and multipliers for error tolerant image processing", Microprocessors and Microsystems, Nov. 11, 2019, pp. 1-7.

Boroumand, A. et al., "Google Workloads for Consumer Devices: Mitigating Data Movement Bottlenecks", Session 4A: Memory 1, Mar. 24-28, 2018, pp. 316-331.

Celia, D. et al., "Probabilistic Error Modeling for Two-part Segmented Approximate Adders", IEEE Xplore, 2018, 5 pages.

Chakraborty, I. et al., "Resistive Crossbars as Approximate Hardware Building Blocks for Machine Learning: Opportunities and Challenges", Proceedings of the IEEE, Jul. 15, 2020, pp. 2276-2310, vol. 108, No. 12.

Deng, Q. et al., "LAcc: Exploiting Lookup Table-based Fast and Accurate Vector Multiplication in DRAM-based CNN Accelerator", Association for Computing Machinery, 2019, 6 pages.

Dube, A., et al., "Tunable Precision Control for Approximate Image Filtering in an In-Memory Architecture with Embedded Neurons", ICCAD '22, Oct. 30-Nov. 3, 2022, 9 pages, San Diego, CA, USA.

Giacomin, E. et al., "A Robust Digital RRAM-Based Convolutional Block for Low-Power Image Processing and Learning Applications", IEEE Transactions on Circuits and Systems—I: Regular Papers, Oct. 9, 2018, pp. 643-654, vol. 66, No. 2.

Gu, P. et al., "iPIM: Programmable In-Memory Image Processing Accelerator Using Near-Bank Architecture", 2020 ACM/IEEE 47th Annual International Symposium on Computer Architecture (ISCA), 2020, pp. 804-817.

Gupta, V. et al., "Low-Power Digital Signal Processing Using Approximate Adders", IEEE Transactions on Computer-Aided Design of Integrated Circuits and Systems, Dec. 19, 2012, pp. 124-137, vol. 32, No. 1.

Haj-Ali, A. et al., "IMAGING: In-Memory AlGorithms for Image processING", IEEE Transactions on Circuits and Systems—I: Regular Papers, Jun. 27, 2018, pp. 4258-4271, vol. 65, No. 12.

He, M. et al., "Newton: A DRAM-maker's Accelerator-in-Memory (AiM) Architecture for Machine Learning", 2020 53rd Annual IEEE/ACM International Symposium on Microarchitecture (MICRO), 2020, pp. 372-385.

Jha, C. et al., "Quality Tunable Approximate Adder for Low Energy Image Processing Applications", IEEE Xplore, 2019, pp. 642-645.

Jung, M. et al., "A New Bank Sensitive DRAMPower Model for Efficient Design Space Exploration", IEEE Xplore, 2016, pp. 283-288.

Kan, Y. et al., "A Multi-Grained Reconfigurable Accelerator for Approximate Computing", 2020 IEEE Computer Society Annual Symposium on VLSI (ISVLSI), 2020, pp. 90-95.

Khaveen Investments, "Micron, Samsung, And SK Hynix: The DRAMOligopoly", May 12, 2020, 12 pages.

Kim, Y. et al., "Ramulator: A Fast and Extensible DRAM Simulator", IEEE Computer Architecture Letters, Mar. 17, 2015, pp. 45-49, vol. 15, No. 1.

Kim, Y-B. et al., "Assessing Merged DRAM/Logic 'Technology'", IEEE Xplore, 1996, pp. 133-136.

Kwon, Y-C. et al., "A 20nm 6GB Function-In-Memory DRAM, Based on HBM2 with a 1.2TFLOPS Programmable Computing Unit Using Bank-Level Parallelism, for Machine Learning Applications", 2021 IEEE International Solid-State Circuits Conference, 2021, pp. 350-352.

Lee, J. et al., "A Novel Approximate Adder Design Using Error Reduced Carry Prediction and Constant Truncation", IEEE Access, Aug. 27, 2021, pp. 119939-119953, vol. 9.

Lei, L. et al., "Joint Computation Offloading and Multiuser Scheduling Using Approximate Dynamic Programming in NB-IoT Edge Computing System", IEEE Internet Of Things Journal, Feb. 21, 2019, pp. 5345-5362, vol. 6, No. 3.

Liu, B. et al.,"Binarized Weight Neural-network Inspired Ultra-low Power Speech Recognition Processor with Time-domain based Digital-analog Mixed Approximate Computing", IEEE, 2020, 5 pages.

Liu, B., et al., "EERA-ASR: An Energy-Efficient Reconfigurable Architecture for Automatic Speech Recognition With Hybrid DNN and Approximate Computing", IEEE Access, 2018, pp. 52227-52237, vol. 6.

Mazahir, S., et al., "Adaptive Approximate Computing in Arithmetic Datapaths", IEEE Design & Test, Jul./Aug. 2018, pp. 65-74, IEEE CEDA, IEEE CASS, IEEE SSCS and TTTC.

Prabakaran, B.S., et al., "ApproxFPGAs: Embracing ASIC-Based Approximate Arithmetic Components for FPGA-Based Systems", 2020, 6 pages, IEEE Xplore.

Salavati, S., et al., "Ultra-Efficient Nonvolatile Approximate Full-Adder With Spin-Hall-Assisted MTJ Cells for In-Memory Computing Applications", IEEE Transactions on Magnetics, May 2021, vol. 57, No. 5.

San Miguel, J., et al., "Load Value Approximation", 2014 47th Annual IEEE/ACM International Symposium on Microarchitecture, 2014, pp. 127-139, IEEE Computer Society.

Seshadri, V., et al., "Ambit: In-Memory Accelerator for Bulk Bitwise Operations Using Commodity DRAM Technology", MICRO-50, Oct. 14-18, 2017, pp. 273-287, Association for Computing Machinery, Cambridge, MA, USA.

Singh, G., et al., "CIDAN-XE: Computing in DRAM with Artificial Neurons", Frontiers in Electronics, Feb. 2022, pp. 1-17, vol. 3, Article 834146.

Soares, L.B., et al., "Design Methodology to Explore Hybrid Approximate Adders for Energy-Efficient Image and Video Processing Accelerators", IEEE Transactions on Circuits and Systems—I: Regular Papers, Jun. 2019, pp. 2137-2150, vol. 66, No. 6., IEEE.

Sutradhar, P.R., et al., "pPIM: A Programmable Processor-in-Memory Architecture With Precision-Scaling for Deep Learning", IEEE Computer Architecture Letters, Jul.-Dec. 2020, pp. 118-121, vol. 19, No. 2.

Wagle, A., et al., "A Configurable BNN ASIC using a Network of Programmable Threshold Logic Standard Cells", ICCD, 2020, pp. 433-440, IEEE.

Wagle, A., et al., "Threshold Logic in a Flash", ICCD, 2019, pp. 550-558, IEEE.

Wulf, W. A., et al., "Hitting the Memory Wall: Implications of the Obvious", Dec. 1994, pp. 20-24.

Xu, W., et al., "A Simple Yet Efficient Accuracy-Configurable Adder Design", IEEE Transactions on Very large Scale Integration (VLSI) Systems, Jun. 2018, pp. 1112-1125, vol. 26, No. 6, IEEE.

Yantir, H.E., et al., "A Hybrid Approximate Computing Approach for Associative In-Memory Processors", IEEE Journal on Emerging and Selected Topics in Circuits and Systems, Dec. 2018, pp. 758-769, IEEE.

Yin, S., et al., "Vesti: Energy-Efficient In-Memory Computing Accelerator for Deep Neural Networks", IEEE Transactions on Very large Scale Integration (VLSI) Systems, Jan. 2020, pp. 48-61, vol. 28, No. 1, IEEE.

Zayer, F., et al., "RRAM Crossbar-Based In-Memory Computation of Anisotropic Filters for Image Preprocessing", IEEE Access, 2020, pp. 127569-127580, vol. 8, Creative Commons Attribution.

Zhu, N. et al., "Enhanced Low-Power High-Speed Adder For Error-Tolerant Application", IEEE Xplore, 2010, pp. 323-327.

* cited by examiner $$\frac{1}{16}\begin{bmatrix} 1 & 2 & 1 \\ 2 & 4 & 2 \\ 1 & 2 & 1 \end{bmatrix}$$

FIG. 1A $$\frac{1}{9}\begin{bmatrix} 1 & 2 & 1 \\ 2 & 4 & 2 \\ 1 & 2 & 1 \end{bmatrix}$$

FIG. 1B $$\begin{bmatrix} 0 & 1 & 0 \\ 1 & -4 & 1 \\ 0 & 1 & 0 \end{bmatrix}$$

FIG. 1C $$\begin{bmatrix} 0 & -1 & 0 \\ -1 & 4 & -1 \\ 0 & -1 & 0 \end{bmatrix}$$

FIG. 1D $$\begin{bmatrix} -1 & -1 & -1 \\ -1 & 8 & -1 \\ -1 & -1 & -1 \end{bmatrix}$$

FIG. 1E $$\begin{bmatrix} -2 & 1 & -2 \\ 1 & 4 & 1 \\ -2 & 1 & -2 \end{bmatrix}$$

FIG. 1F $$\frac{1}{16}\begin{bmatrix} -1 & -2 & -1 \\ -2 & 12 & -2 \\ -1 & -2 & -1 \end{bmatrix}$$

FIG. 1G $$\frac{d}{dx} = \begin{bmatrix} -1 & 0 & 1 \\ -1 & 0 & 1 \\ -1 & 0 & 1 \end{bmatrix}, \quad \frac{d}{dy} = \begin{bmatrix} -1 & -1 & -1 \\ 0 & 0 & 0 \\ 1 & 1 & 1 \end{bmatrix}$$

FIG. 1H $$\frac{d}{dx} = \begin{bmatrix} -1 & 0 & 1 \\ -2 & 0 & 2 \\ -1 & 0 & 1 \end{bmatrix}, \quad \frac{d}{dy} = \begin{bmatrix} -1 & -2 & -1 \\ 0 & 0 & 0 \\ 1 & 2 & 1 \end{bmatrix}$$

FIG. 1I

| Functions | Definition |
|---|---|
| $Z([N-1:0]x, n) = \{x[N-1:n], n'b0\}$ | Returns operand $x$ after zeroing its $n$ LSB bits. |
| $RS([N-1:0]x, n) = \{n'b0, x[N-1:n]\}$ | Returns operand $x$ after right shifting it by $n$-bits. |
| $LS([N-1:0]x, n) = \{x[N-1:0], n'b0\}$ | Returns operand $x$ after left shifting it by $n$-bits. |

FIG. 6B

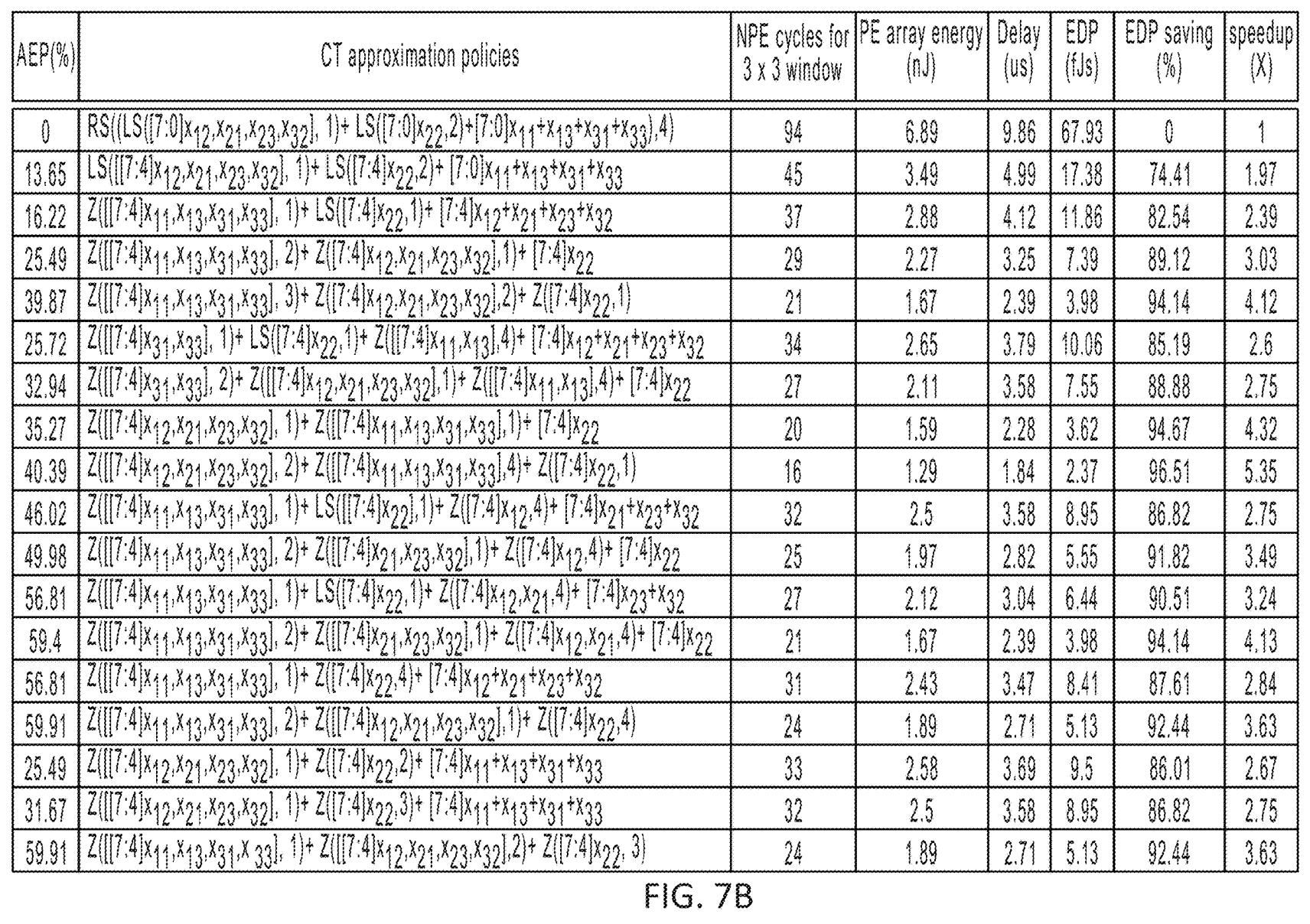

| AEP(%) | CT approximation policies | NPE cycles for 3 x 3 window | PE array energy (nJ) | Delay (us) | EDP (fJs) | EDP saving (%) | speedup (X) |
|---|---|---|---|---|---|---|---|
| 0 | RS((LS([7:0]x12,x21,x23,x32], 1)+ LS([7:0]x22,2)+[7:0](x11+x13+x31+x33),4) | 94 | 6.89 | 9.86 | 67.93 | 0 | 1 |
| 13.65 | LS([[7:4]x12,x21,x23,x32], 1)+ LS([7:4]x22,2)+ [7:4](x11+x13+x31+x33) | 45 | 3.49 | 4.99 | 17.38 | 74.41 | 1.97 |
| 16.22 | Z([7:4]x11,x13,x31,x33], 1)+ [7:4]x22,1)+[7:4](x12+x21+x23+x32) | 37 | 2.88 | 4.12 | 11.86 | 82.54 | 2.39 |
| 25.49 | Z([7:4]x11,x13,x31,x33], 2)+ Z([7:4]x12,x21,x23,x32,1)+ [7:4]x22 | 29 | 2.27 | 3.25 | 7.39 | 89.12 | 3.03 |
| 39.87 | Z([7:4]x11,x13,x31,x33], 3)+ Z([7:4]x12,x21,x23,x32,2)+ Z([7:4]x22,1) | 21 | 1.67 | 2.39 | 3.98 | 94.14 | 4.12 |
| 25.72 | Z([7:4]x31,x33], 1)+ LS([7:4]x22,1)+ Z([7:4]x12,x11,x13,1,4)+ [7:4]x12+x21+x23+x32 | 34 | 2.65 | 3.79 | 10.06 | 85.19 | 2.6 |
| 32.94 | Z([7:4]x31,x33], 2)+ Z([7:4]x12,x21,x23,x32,1)+ Z([7:4]x11,x13,x33,1,4)+ [7:4]x22 | 27 | 2.11 | 3.58 | 7.55 | 88.88 | 2.75 |
| 35.27 | Z([7:4]x12,x21,x23,x32], 1)+ Z([7:4]x11,x13,x31,x33,1)+ [7:4]x22 | 20 | 1.59 | 2.28 | 3.62 | 94.67 | 4.32 |
| 40.39 | Z([7:4]x12,x21,x23,x32], 2)+ Z([7:4]x11,x13,x31,x33,4)+ Z([7:4]x22,1) | 16 | 1.29 | 1.84 | 2.37 | 96.51 | 5.35 |
| 46.02 | Z([7:4]x11,x13,x31,x33], 2)+ LS([7:4]x22,2)+ Z([7:4]x12,x21,x23,x32) | 32 | 2.5 | 3.58 | 8.95 | 86.82 | 2.75 |
| 49.98 | Z([7:4]x11,x13,x31,x33], 2)+ Z([7:4]x12,x21,x23,x32,1)+ Z([7:4]x22,4) | 25 | 1.97 | 2.82 | 5.55 | 91.82 | 3.49 |
| 56.81 | Z([7:4]x11,x13,x31,x33], 1)+ LS([7:4]x22,1)+ Z([7:4]x12,x21,4)+ [7:4]x23+x32 | 27 | 2.12 | 3.04 | 6.44 | 90.51 | 3.24 |
| 59.4 | Z([7:4]x11,x13,x31,x33], 2)+ Z([7:4]x12,x21,23,4)+ [7:4]x22 | 21 | 1.67 | 2.39 | 3.98 | 94.14 | 4.13 |
| 56.81 | Z([7:4]x11,x13,x31,x33], 2)+ Z([7:4]x22,4)+ [7:4]x12+x21+x23+x32 | 31 | 2.43 | 3.47 | 8.41 | 87.61 | 2.84 |
| 59.91 | Z([7:4]x11,x13,x31,x33], 2)+ Z([7:4]x12,x21,x23,x32,1)+ Z([7:4]x22,4) | 24 | 1.89 | 2.71 | 5.13 | 92.44 | 3.63 |
| 25.49 | Z([7:4]x12,x21,x23,x32], 2)+ [7:4]x22,1)+ [7:4]x11+x13+x31+x33 | 33 | 2.58 | 3.69 | 9.5 | 86.01 | 2.67 |
| 31.67 | Z([7:4]x12,x21,x23,x32], 3)+ [7:4]x22,1)+ [7:4]x11+x13+x31+x33 | 32 | 2.5 | 3.58 | 8.95 | 86.82 | 2.75 |
| 59.91 | Z([7:4]x11,x13,x31,x33], 1)+ Z([7:4]x12,x21,x23,x32,2)+ Z([7:4]x22,3) | 24 | 1.89 | 2.71 | 5.13 | 92.44 | 3.63 |

FIG. 7B

| AEP (%) | CT and ECD approximation policies | NPE cycles for 3 x 3 window | PE array energy (nJ) | Delay (us) | EDP (fJs) | EDP saving (%) | speedup (X) |
|---|---|---|---|---|---|---|---|
| 3.4 | $RS([7.0]x_{1,3})+RS([7.0]x_{1,3})+...+RS([7.0]x_{33},3)$ | 50 | 7.64 | 10.93 | 83.5 | 74.1 | 1.96 |
| 2.85 | $RS([7.0]x_{1,4})+RS([7.0]x_{1,4})+...+RS([7.0]x_{33},4)$ | 49 | 3.79 | 5.42 | 20.54 | 93.63 | 3.96 |
| 5.87 | $Z(RS([7.0]x_{1,4}),1)+Z(RS([7.0]x_{1,2},4),1)+...+Z(RS([7.0]x_{33},4),1)$ | 40 | 3.11 | 4.45 | 13.81 | 95.71 | 4.83 |
| 11.96 | $Z(RS([7.0]x_{1,4}),2)+Z(RS([7.0]x_{1,2},4),2)+...+Z(RS([7.0]x_{33},4),2)$ | 31 | 2.43 | 3.47 | 8.41 | 97.39 | 6.19 |
| 7.8 | $Z(RS([7.0]x_{1,3}),1)+Z(RS([7.0]x_{1,2},3),1)+...+Z(RS([7.0]x_{33},3),1)$ | 45 | 6.89 | 9.86 | 67.93 | 78.93 | 2.18 |
| 16.17 | $Z(RS([7.0]x_{1,3}),2)+Z(RS([7.0]x_{1,2},3),2)+...+Z(RS([7.0]x_{33},3),2)$ | 36 | 5.54 | 7.93 | 43.93 | 86.37 | 2.71 |
| 32.92 | $Z(RS([7.0]x_{1,3}),3)+Z(RS([7.0]x_{1,2},3),3)+...+Z(RS([7.0]x_{33},3),3)$ | 27 | 4.19 | 6 | 25.14 | 92.2 | 3.58 |
| 6.84 | $Z(RS([7.0]x_{1,4}),4)+Z(RS([7.0]x_{1,2},4),1)+...+Z(RS([7.0]x_{33},4),1)$ | 37 | 2.88 | 4.12 | 11.87 | 96.31 | 5.21 |
| 10.49 | $Z(RS([7.0]x_{1,4}),4)+Z(RS([7.0]x_{1,2},4),4)+Z(RS([7.0]x_{13},4),1)+...+Z(RS([7.0]x_{33},4),1)$ | 34 | 2.65 | 3.79 | 10.07 | 96.87 | 5.67 |
| 23.97 | $Z(RS([7.0]x_{1,3}),5)+Z(RS([7.0]x_{1,2},3),2)+...+Z(RS([7.0]x_{33},3),2)$ | 33 | 5.09 | 7.29 | 37.1 | 88.49 | 2.94 |
| 33.48 | $Z(RS([7.0]x_{1,3}),5)+Z(RS([7.0]x_{1,2},3),2)+...+Z(RS([7.0]x_{13},3),2)+...+Z(RS([7.0]x_{33},3),2)$ | 30 | 4.64 | 6.64 | 30.8 | 90.44 | 3.2 |

FIG. 7C

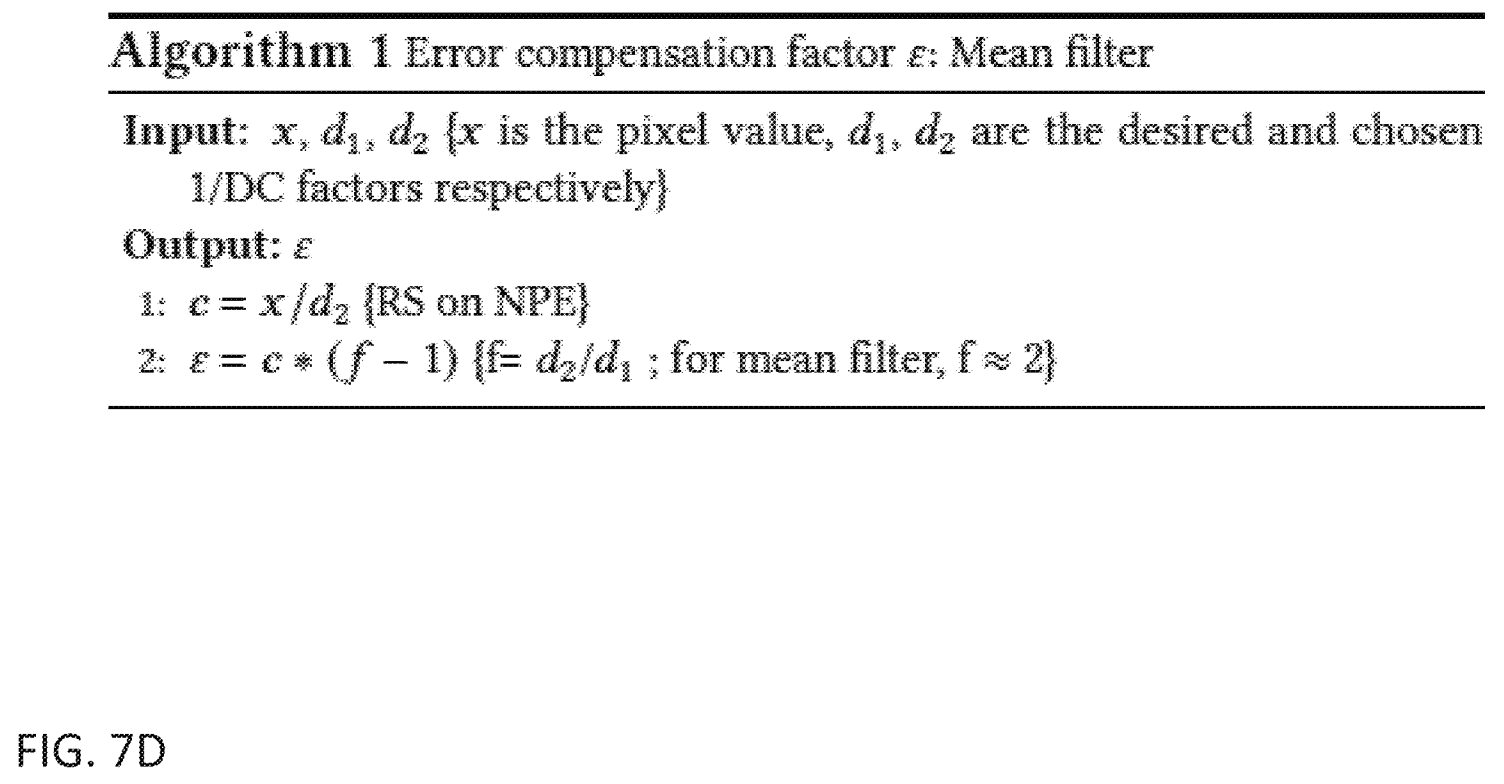

Algorithm 1 Error compensation factor $\varepsilon$: Mean filter

Input: $x$, $d_1$, $d_2$ {$x$ is the pixel value, $d_1$, $d_2$ are the desired and chosen 1/DC factors respectively}

Output: $\varepsilon$

1: $c = x / d_2$ {RS on NPE}

2: $\varepsilon = c * (f - 1)$ {$f = d_2 / d_1$ ; for mean filter, $f \approx 2$}

FIG. 7D

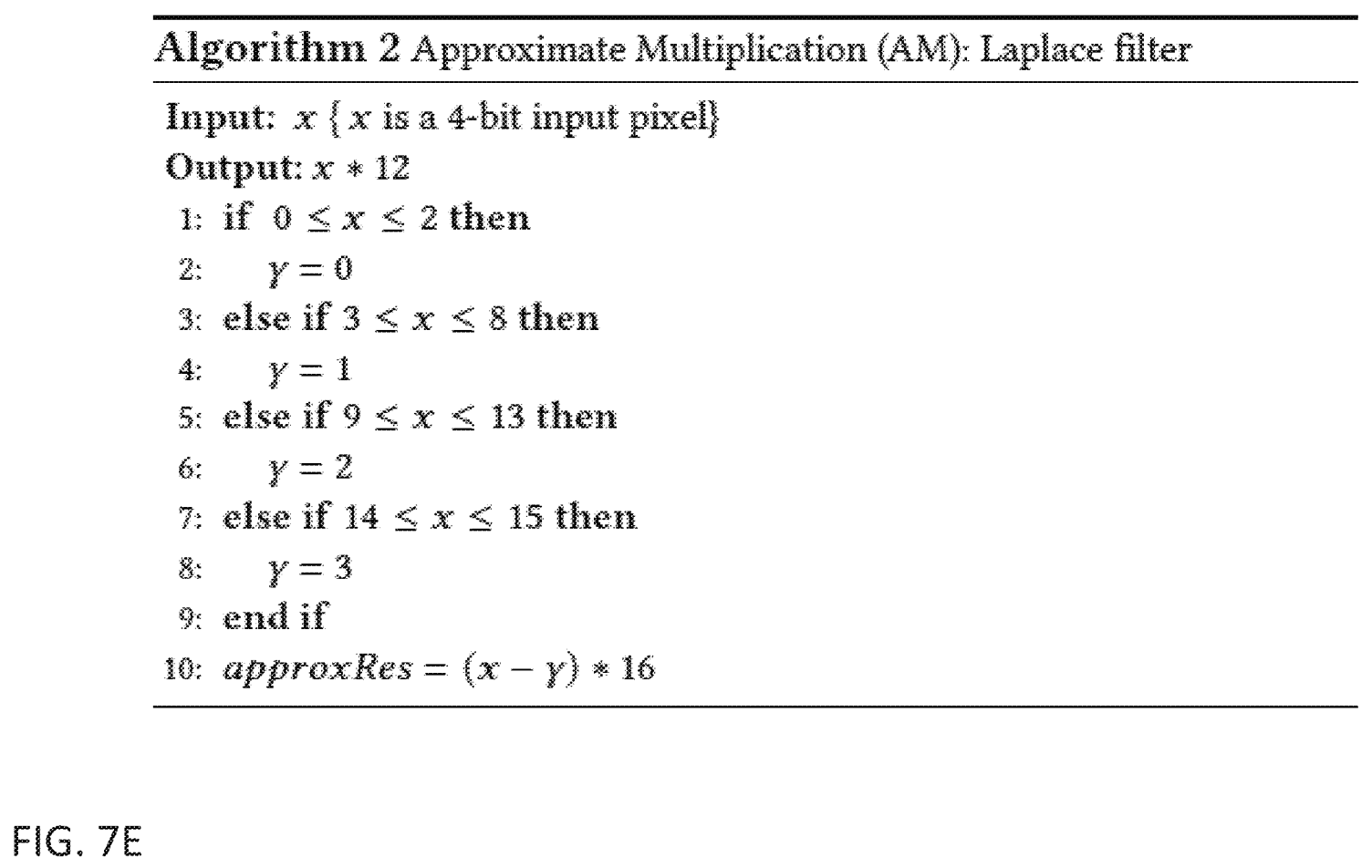

Algorithm 2 Approximate Multiplication (AM): Laplace filter

Input: $x$ { $x$ is a 4-bit input pixel}

Output: $x * 12$

1: if $0 \leq x \leq 2$ then

2:     $y = 0$

3: else if $3 \leq x \leq 8$ then

4:     $y = 1$

5: else if $9 \leq x \leq 13$ then

6:     $y = 2$

7: else if $14 \leq x \leq 15$ then

8:     $y = 3$

9: end if

10: $approxRes = (x - y) * 16$

FIG. 7E

| | Energy $\mu J$ | | | Delay ms | | |
|---|---|---|---|---|---|---|
| | TULIPA | MAC | | | TULIPA | MAC |
| PSNR ($\infty$, 55 dB] | 6.431 | 19,360 (3X) | | Exact | 0.059 | 0.136 (2.3X) |
| PSNR ($\sim$ 20 dB, 25 dB)) | 3.215 | 9.68 (3X) | | Approximate | 0.029 | 0.068 (2.3X) |

FIG. 8B

| Filter and approx. policy | PSNR (dB) | Energy (uJ) | Delay (us) |
|---|---|---|---|
| G, Z(([7:0]$x_{11}$,$x_{13}$],1)+[7:0]$x_{12}$+$x_{21}$+...+$x_{33}$ | 60.22 | 6.431 | 59.902 |
| G, Z(([7:0]$x_{11}$,$x_{13}$,$x_{31}$,$x_{33}$],1)+LS([7:0]$x_{22}$,1)+[7:0]$x_{12}$+$x_{21}$+$x_{23}$+$x_{32}$ | 58.45 | 6.417 | 59.475 |
| G, Z([7:0]$x_{11}$,4)+ Z([7:0]$x_{12}$,4)+...+ Z([7:0]$x_{33}$,4) | 30.76 | 3.177 | 30.245 |
| G, Z([[7:0]$x_{12}$,$x_{21}$,$x_{22}$,$x_{23}$,$x_{31}$,$x_{32}$,$x_{33}$],4)+...+ Z([[7:0]$x_{11}$,$x_{13}$],8) | 29.76 | 6.41 | 59.261 |
| G, Z([7:4]$x_{11}$,$x_{13}$,$x_{31}$,$x_{33}$],1)+LS([7:4]$x_{22}$,1)+ [7:0]$x_{12}$+$x_{21}$+...+$x_{33}$ | 28.66 | 3.149 | 29.384 |
| M, RS([[7:0]$x_{11}$],4)+ RS([[7:0]$x_{12}$],4)+...+ RS([[7:0]$x_{33}$],4) | 25.99 | 3.191 | 30.675 |
| M, RS([[7:0]$x_{11}$],3)+ RS([[7:0]$x_{12}$],3)+...+ RS([[7:0]$x_{33}$],3) | 23.72 | 6.501 | 60.969 |
| L, SK, v=3 | 21.61 | 3.068 | 26.909 |
| L, SK, v=5 | 23.33 | 3.05 | 26.371 |
| L, BK | 31.63 | 2.446 | 18.9 |
| S, Z([7:0]$x_{11}$,1)+ Z([7:0]$x_{12}$,1)+...+ Z([7:0]$x_{33}$,1) | 48.16 | 6.494 | 61.823 |
| S, Z([7:0]$x_{11}$,2)+ Z([7:0]$x_{12}$,2)+...+ Z([7:0]$x_{33}$,2) | 39.68 | 6.452 | 60.542 |
| S, Z([7:0]$x_{11}$,4)+ Z([7:0]$x_{12}$,4)+...+ Z([7:0]$x_{33}$,4) | 27.08 | 3.124 | 28.631 |
| S, Z([7:0]$x_{11}$,5)+ Z([7:0]$x_{12}$,5)+...+ Z([7:0]$x_{33}$,5) | 21.46 | 3.103 | 27.986 |

FIG. 8C

SYSTEM AND METHOD FOR IN-MEMORY IMAGE PROCESSING

CROSS-REFERENCE TO RELATED APPLICATION(S)

The present application claims priority to and the benefit of U.S. Provisional Application No. 63/508,253, filed Jun. 14, 2023, entitled "SYSTEM AND METHOD FOR IN-MEMORY IMAGE PROCESSING", the entire content of which is incorporated herein by reference.

GOVERNMENT LICENSE RIGHTS

This invention was made with government support under 2008244 awarded by the National Science Foundation. The government has certain rights in the invention.

FIELD

One or more aspects of embodiments according to the present disclosure relate to image processing, and more particularly to a system and method for in-memory image processing.

BACKGROUND

Image processing operations, such as image filtering, may be data-intensive operations, which may consume significant amounts of energy. In some applications, the available energy and power may be limited.

It is with respect to this general technical environment that aspects of the present disclosure are related.

SUMMARY

According to an embodiment of the present disclosure, there is provided a system including: a memory; a first neuron processing circuit; and a second neuron processing circuit, the first neuron processing circuit being connected to a first plurality of bit lines of the memory, the second neuron processing circuit being connected to a second plurality of bit lines of the memory, the first neuron processing circuit including a plurality of configurable processing circuits, each of the configurable processing circuits including: an artificial neuron for calculating the sign of a weighted sum of a plurality of single-bit digital input signals at respective inputs of the artificial neuron, and a plurality of multiplexers, each having an output connected to a respective input of the inputs of the artificial neuron.

In some embodiments, each of the configurable processing circuits of the first neuron processing circuit is connected to each of the other configurable processing circuits of the first neuron processing circuit.

In some embodiments, each of the configurable processing circuits of the first neuron processing circuit further includes a register for storing one or more bits.

In some embodiments, the weighted sum is a weighted sum of four terms.

In some embodiments, the weights corresponding to the four terms are 1, 1, 1, and −2.

In some embodiments, the memory, the first neuron processing circuit, and the second neuron processing circuit are fabricated on a single semiconductor chip.

According to an embodiment of the present disclosure, there is provided a system including: a memory; a first neuron processing circuit; and a second neuron processing circuit, the first neuron processing circuit being connected to a first plurality of bit lines of the memory, the second neuron processing circuit being connected to a second plurality of bit lines of the memory, the first neuron processing circuit including a plurality of multiplexers and being configured to perform: a multi-bit addition when the multiplexers receive a first set of control signals, and a multi-bit comparison when the multiplexers receive a second set of control signals.

In some embodiments, the first neuron processing circuit includes a plurality of configurable processing circuits, a first configurable processing circuit of the configurable processing circuits including: an artificial neuron for calculating the sign of a weighted sum of a plurality of single-bit digital input signals at respective inputs of the artificial neuron, and a plurality of the multiplexers of the first neuron processing circuit, each of the plurality of multiplexers of the first configurable processing circuit having an output connected to a respective input of the inputs of the artificial neuron.

In some embodiments, each of the configurable processing circuits of the first neuron processing circuit is connected to each of the other configurable processing circuits of the first neuron processing circuit.

In some embodiments, each of the configurable processing circuits of the first neuron processing circuit further includes a register for storing one or more bits.

In some embodiments, the weighted sum is a weighted sum of four terms.

In some embodiments, the weights corresponding to the four terms are 1, 1, 1, and −2.

In some embodiments, the memory, the first neuron processing circuit, and the second neuron processing circuit are fabricated on a single semiconductor chip.

According to an embodiment of the present disclosure, there is provided a method for computing, by a system, the system including: a memory; a first neuron processing circuit; and a second neuron processing circuit, the first neuron processing circuit being connected to a first plurality of bit lines of the memory, the second neuron processing circuit being connected to a second plurality of bit lines of the memory, the first neuron processing circuit including a plurality of configurable processing circuits, a first configurable processing circuit of the configurable processing circuits including: an artificial neuron for calculating the sign of a weighted sum of a plurality of single-bit digital input signals at respective inputs of the artificial neuron, and a plurality of multiplexers, each having an output connected to a respective input of the inputs of the artificial neuron, the method including: applying a first sequence of control signals to the multiplexers of the first configurable processing circuit; and in response to the first sequence of control signals, calculating a sum, by the first configurable processing circuit.

In some embodiments, the method further includes: applying a second sequence of control signals to the multiplexers of the first configurable processing circuit; and in response to the first sequence of control signals, performing a comparison, by the first configurable processing circuit.

In some embodiments, the sum is a sum of: a first binary integer, left-shifted by a first number of bit positions, and a second binary integer, left-shifted by a second number of bit positions, the second number of bit positions being different from the first number of bit positions.

In some embodiments, the method further includes forming the second binary integer as a subset of bits of a third binary integer.

In some embodiments, the method further includes calculating an approximate product of a first integer and a second integer, the calculating including: subtracting a third integer from the first integer to form a difference, and left-shifting the difference by a first number of bit positions, wherein: the third integer is determined based on the first integer; and the first number of bit positions is based on the second integer.

In some embodiments, the third integer is determined by: determining that the first integer is within a first range of values, the first range of values being based on a previously performed comparison, and setting the third integer equal to a value associated with the first range of values.

In some embodiments, the memory, the first neuron processing circuit, and the second neuron processing circuit are fabricated on a single semiconductor chip.

BRIEF DESCRIPTION OF THE DRAWINGS

These and other features and advantages of the present disclosure will be appreciated and understood with reference to the specification, claims, and appended drawings wherein:

Each of FIGS. 1A-1I is a matrix or pair of matrices representing a respective filter, according to an embodiment of the present disclosure;

FIG. 6B is a table of operations, according to an embodiment of the present disclosure;

FIG. 7B is a table of operations, according to an embodiment of the present disclosure;

FIG. 7C is a table of operations, according to an embodiment of the present disclosure;

FIG. 7D is a definition of an algorithm, according to an embodiment of the present disclosure;

FIG. 7E is a definition of an algorithm, according to an embodiment of the present disclosure;

FIG. 8B is a table of energy usage and delay, according to an embodiment of the present disclosure; and FIG. 8C is a table of performance parameters, according to an embodiment of the present disclosure.

DETAILED DESCRIPTION

Figure 2:
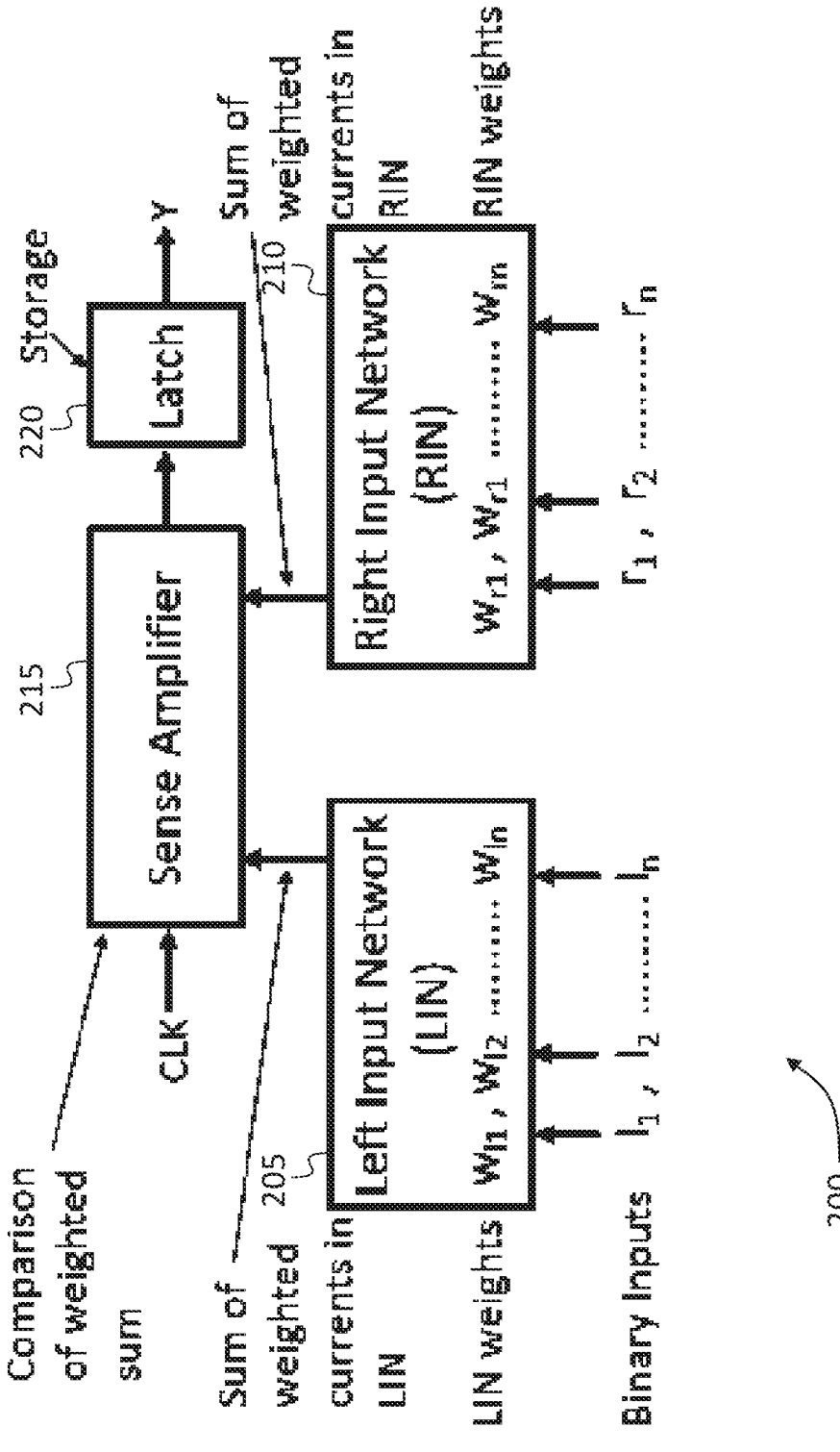
FIG. 2 is a block diagram of an artificial neuron, according to an embodiment of the present disclosure.

The detailed description set forth below in connection with the appended drawings is intended as a description of exemplary embodiments of a system and method for in-memory image processing provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

A substantial part of the high energy consumption (>60%) and large latency (>90%) of conventional von-Neumann architectures can be attributed to the unavoidable data movement between the processor and main memory (DRAM). This is perhaps the major limiting factor for big data and machine learning applications the usage of which is permeating into many domains of computing. This has reinvigorated and accelerated the development of processing in-memory (PiM) architectures, which involves integrating processing elements inside the memory architecture so that the data can be processed in place, avoiding the data transfers between the processor and memory.

Although PiM architectures are not a panacea for all applications, they are well suited for image filtering because the image data is in the form of arrays. The logic circuits within or near the memory can perform bit-level operations directly on memory cells and in parallel. PiM architectures for image and signal processing applications may improve energy efficiency and latency substantially, sometimes by orders of magnitude. Image filtering tasks belong to the category of error tolerant applications because the precision of the computation can be reduced without substantially degrading the perceived quality of the image or even affecting any subsequent decision that is made based on the image. For instance, cameras used for traffic surveillance may operate in a low precision mode to detect objects like cars, and subsequent processing may operate in high precision mode to capture details such as a license plate number. The ability to dynamically switch between different levels of precision is extremely valuable in edge computing with smart cameras, as more computation is being moved closer to the point of data acquisition.

Some architectures include hardware for both exact and approximate computations and control logic that allows for switching between the two at runtime. Although the sole use of these architectures for approximate calculations results in a significant reduction in energy consumption and latency (40%-50%), substantial penalties are incurred in the area (for including both) and in energy and latency for switching between the approximate and exact calculations. That is, their advantages for dynamic switching are severely diminished or are simply non-existent.

As such, some embodiments, referred to herein as TulipA, allow fine-grain switching (e.g., at the granularity of a single arithmetic operation) between an exact and an approximate computation without sacrificing area, performance, or energy efficiency. TulipA includes (e.g., consists of) a DRAM that is connected to a (scalable) collection of neuron processing elements (NPE), on which arithmetic operations can be scheduled in such a way that any degree of approximation can be performed by simply scheduling an appropriate subset of the operations. The NPEs may be fabricated on the same integrated circuit (e.g., on the same silicon chip) as the DRAM. In some application-specific integrated circuit (ASIC) designs, switching between two functions requires provisioning hardware for both and selecting one of them. This incurs an area penalty. Alternatively, in the case of a field-programmable gate array (FPGA), switching requires reconfiguring the lookup tables (LUTs). In this case, a performance penalty results. In TulipA there is no area penalty for allowing both approximate and exact computation because switching between the two is done by changing a schedule. Moreover, this results in a linear improvement in throughput and energy efficiency when approximating a calculation because fewer computations are scheduled. TulipA is scalable because its throughput can be linearly increased by adding more NPEs.

Some embodiments provide the following features. In some embodiments, given a lower bound on the desired peak signal-to-noise ratio (PSNR), the hardware-software co-design methodology of TulipA determines a filter specific approximation strategy that produces an output that satisfies the PSNR lower bound. An approximation strategy specifies one or more operations (or functions; defined in the table of FIG. 6B) to be applied to some or all pixels in a given window. In some embodiments, TulipA can also be used to achieve a given throughput, trading off precision and energy efficiency. In some embodiments, TulipA permits dynamic tuning of the PSNR on a frame-by-frame basis. It can accommodate any filter without changes to the design methodology or hardware.

Digital image filtering (DIF) may be used to suppress either the high frequencies (i.e., smoothing the image) or low frequencies (i.e., enhancing or detecting edges) in the image. It has significant tolerance to error due to the limitations of the human visual system (HVS), which considers a 30 dB to 50 dB peak signal-to-noise ratio (PSNR) range sufficient for most image processing applications. This makes digital image filtering a strong candidate for approximate computation (AC).

In some examples, digital image filtering involves a digital convolution operation of a k×k input image window (I) and a k×k filter matrix (H) to produce a k×k output matrix (O). Thus the basic operation involves element by element multiplication of a k×k window of the image with the k×k matrix H, and replacing the center pixel in the image window with a scaled sum of the products. This step is repeated by sliding the image window across the whole image in raster scan fashion. FIGS. 1A through 1I show examples of digital image filters, including a Gaussian filter (FIG. 1A), a mean filter (FIG. 1B), a first 4-neighbor filter (FIG. 1C), a second 4-neighbor filter (FIG. 1D), an 8-neighbor filter (FIG. 1E), a component filter (FIG. 1F), a Laplace (high pass) filter (FIG. 1G), a Prewitt filter (FIG. 1H), and a Sobel filter (FIG. 1I). Zero padding may be used when the image window extends beyond the image.

Approximation of the convolution operation may be done either at the operation level or the image level. At the operation level, the bits of the result are split into two parts based on their significance. The output bits with higher significance are calculated exactly, while the bits with lower significance are approximated. For instance, in an addition operation, the least significant bits (LSB) may be ignored, or the carry may be suppressed. The hardware for such an addition operation is much faster than the conventional adder performing exact calculations. Approximation techniques for addition also include carry prediction and error control. Carry prediction may be used to predict the input carry of a full-adder (FA) based on some function of the input operands. Error control techniques, also called error compensation, may be used to bias the error based on input values or the error value. These techniques may result in energy-efficient designs but at the cost of accuracy and control and data-path hardware overhead (which may be 20%-30%).

Approximation techniques performed at the image level may be based on exploiting the strong spatial correlation among the pixel values in some images. For example, instead of computing an output pixel value exactly, it may be faster to estimate the pixel value based on the output values of the neighboring pixels. Such techniques allow significant improvements in energy-efficiency and performance (e.g., roughly 50%-80%). Such approximation techniques may be modified to suit the error tolerance of the application.

Some approximate computation architectures only support a fixed error, determined during circuit design. As mentioned above, in some embodiments of the present disclosure, the desired error percentage is tunable, without sacrificing either energy efficiency or throughput.

Processing in memory (PiM) architectures may efficiently exploit the massively parallel infrastructure of a memory architecture to deliver high throughput for data-intensive applications. These architectures are particularly well suited for digital image filtering as they are data-intensive applications for which the same computation needs to be run repeatedly for all of the pixels. The throughput and energy-efficiency of PiM for digital image filtering may be increased further if approximate computation is used in digital image filtering. A PiM architecture may consist of (e.g., include) processing element (PE) arrays, tightly coupled with the memory to reduce delay and energy expenditure. Variations of memory technologies used in PiM architectures may include High Bandwidth Memory (HBM, a 3D structure), and emerging devices such as Magnetic Tunnel Junction (MTJ) memory and resistive random-access memory (RRAM).

Some PiM architectures either improve the PEs as a standalone compute unit, or use newer memory technologies that are not easily scalable or are expensive to manufacture. Furthermore, significant optimizations in algorithms and techniques that focus on improving the digital image filtering applications without incurring the cost associated with flexible computation may be lacking. In some embodiments, TulipA uses conventional DRAM with better and robust storage management strategies that are easily and cost effectively (e.g., with no change to DRAM) integrated with the NPEs, and exploits the inherent parallelism. The hardware-software co-design methodology that may be part of TulipA achieves easy reconfigurability with minimum cost and allows full exploration of the efficiency, precision, and throughput (EPT) trade-offs.

Some embodiments use a neuron processing element (NPE) including one or more artificial neurons used to implement threshold-logic functions, as part of a PiM architecture.

A subset of Boolean functions, which may be referred to as threshold functions $f(x_1, x_2, \ldots x\_n)$ can be represented in the form of Equation 1, where $\Sigma$ denotes the arithmetic sum, $w_i$ for i=1, 2, . . . n are weights and T is a threshold value (without loss of generality, the weights and the threshold may be integers).

$$f(x_1, x_2, \ldots x\_n) = 1 \Leftrightarrow \sum_{i=1}^{n} w_i x_i \geq T \tag{1}$$

The physical implementation of threshold functions may be referred to as an artificial neuron (AN). In some embodiments, an artificial neuron 200 is implemented using the structure illustrated in FIG. 2. An AN may consist of (e.g., include) a left input network (LIN) 205 having one or more inputs (which may be referred to as the left inputs $l_i$ of the AN), a right input network (RIN) 210 having one or more inputs (which may be referred to as the right inputs $r_i$ of the AN), a sense amplifier (SA) 215, and a set-reset (SR) latch 220. Each of the left inputs and each of the right inputs may be a one-bit digital input. Each of the LIN 205 and the RIN 210 may consist of (e.g., include) a set of switchable current sources (e.g., transistors constructed to supply a fixed current, or flash transistors constructed to supply a programmable current) driving a common node (the sum output of the LIN 205 or the RIN 210). Each of the switchable current sources may be switched on or off according to whether the value at a respective corresponding input (of the left inputs and right inputs) is a one or a zero. The LIN 205 implements the $$\sum\nolimits_{i=1}^{n} w_i x_i$$

part (for the positive weights) and the RIN 210 implements T (and any negative weights) of Equation 1, by mapping the inputs $x_i$ to $l_i$ and appropriate power and ground signals to $r_i$. Alternate arrangements in which part of the $$\sum\nolimits_{i=1}^{n} w_i x_i$$

is implemented by the LIN 205 and the remainder by the RIN 210 are also feasible. The cell delay and robustness depends on the distribution of signals. The AN computes the predicate in Equation 1 in such a way that the conductivity of the LIN 205 may be much greater than that of the RIN 210 for all on-set minterms of $f$, and vice versa for the off-set minterms. The sense amplifier detects this difference and sets the output latch to 1 or 0.

Figure 3A:
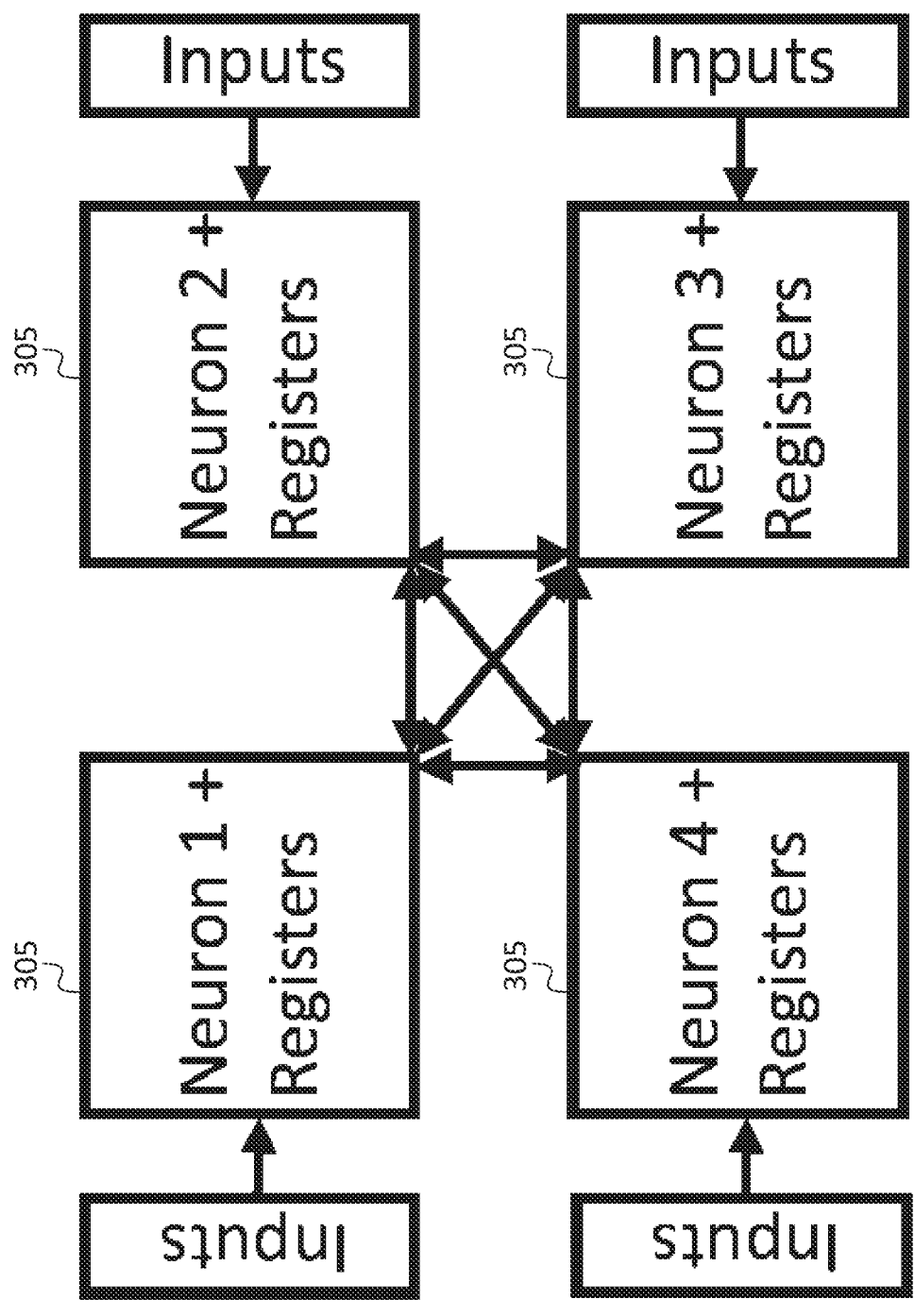
FIG. 3A is a block diagram of a neuron processing element, according to an embodiment of the present disclosure.
Figure 3B:
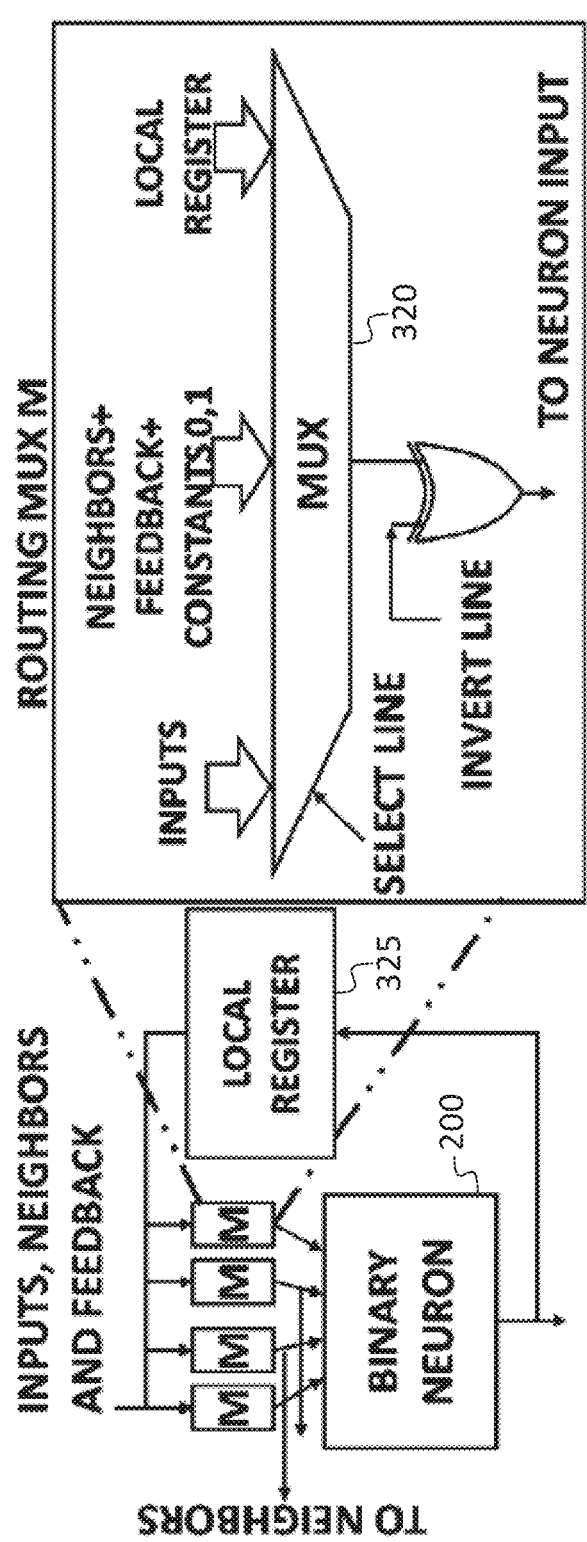
FIG. 3B is a block diagram of a configurable processing circuit, according to an embodiment of the present disclosure.

The processing element of the present disclosure is called a neuron processing element (NPE) (or "neuron processing circuit") and is shown in FIG. 3A. It includes several, e.g., four (as illustrated in FIG. 3A) configurable processing circuits 305 connected as a complete graph. Each configurable processing circuit 305 includes an associated local register 325 (FIG. 3B) (which may be, e.g., a 16-bit register) to store and fetch data. Several operations, such as addition, multiplication, comparison, etc., used for image filtering, can be executed on the NPE. FIG. 3B shows the details of the configurable processing circuit 305. Each of the inputs of the binary neuron 200 (which may be implemented as illustrated in FIG. 2) may be fed by a respective multiplexer 320, which is controlled by an (externally supplied, multi-bit (e.g., 5-bit)) select line, and which may select from (i) external inputs (e.g., bit lines of the DRAM memory), (ii) inputs from neighboring configurable processing circuits 305, (iii) feedback (from the output of the configurable processing circuit 305), (iv) constants (i.e., 0 or 1) and (v) data stored in the local register 325. The outputs of the multiplexers 320 and the output of the binary neuron 200 may be connected to (inputs of multiplexers 320 of) the neighboring three configurable processing circuits 305 (the connections between the configurable processing circuits 305 illustrated in FIG. 3A are such connections).

Figure 4:
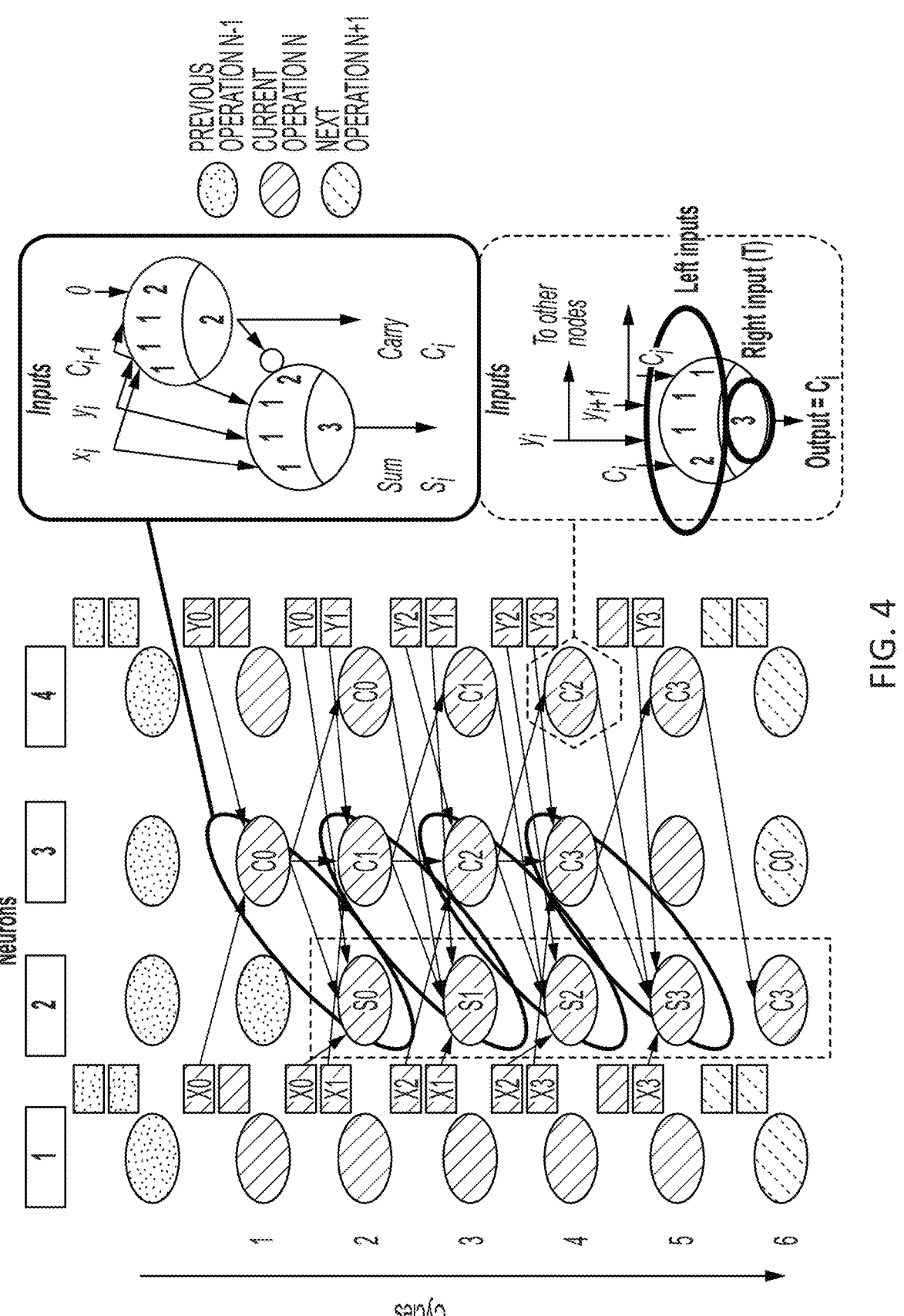
FIG. 4 is an operation sequence diagram, according to an embodiment of the present disclosure.
Figure 5:
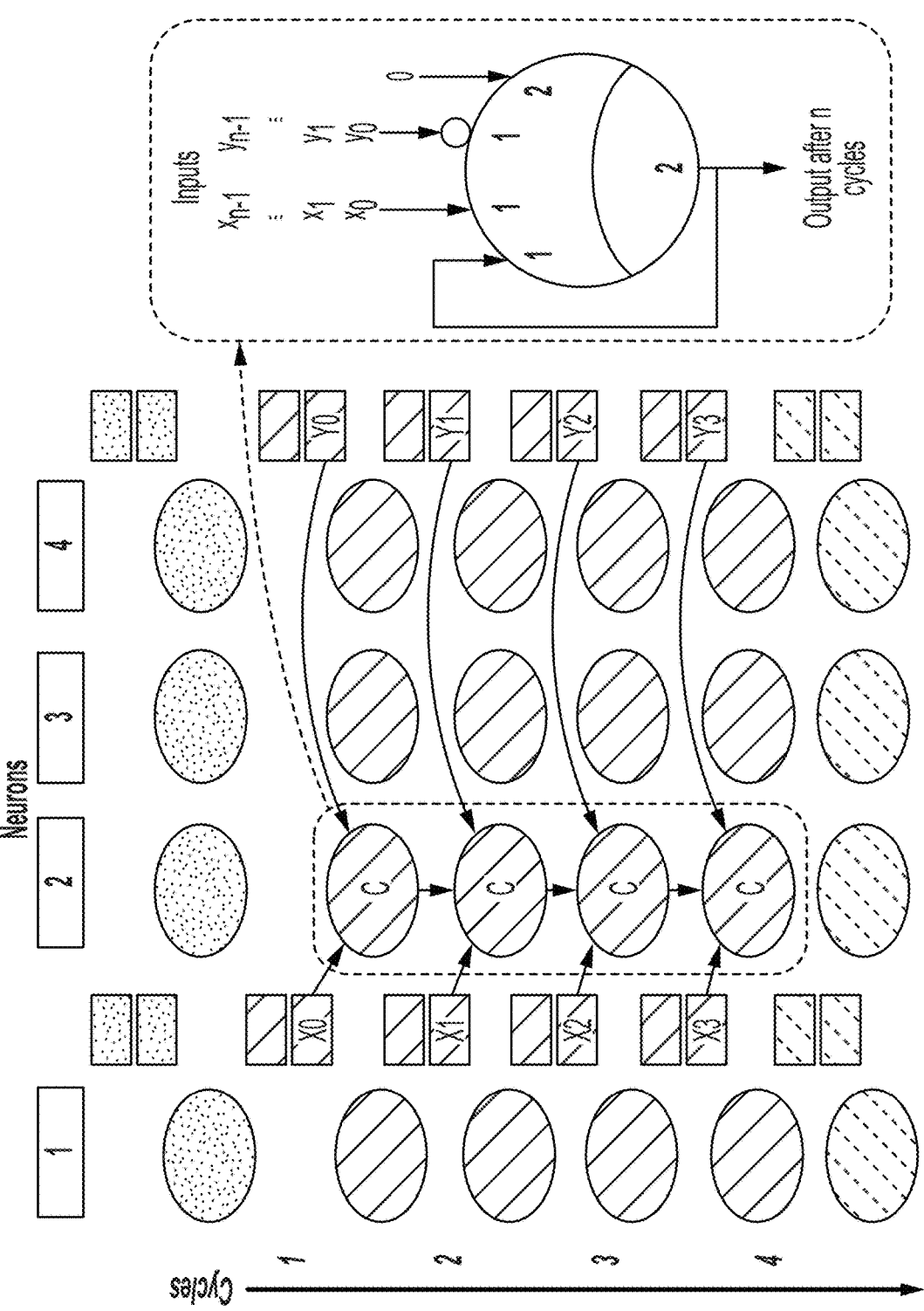
FIG. 5 is an operation sequence diagram, according to an embodiment of the present disclosure.

An operation may be executed on an NPE by first decomposing the operation into a network of fan-in bounded threshold functions and then scheduling the operation on the neurons 200 of the NPE. For instance, FIG. 4 shows how an NPE can perform the addition of two 4-bit numbers, X and Y. The addition operation decomposes as a ripple carry adder, such that each full adder consists of two threshold functions: one for the sum function and the other for the carry function. In FIG. 4, the configurable processing circuits 305 are referred to as neurons. The AN of each configurable processing circuit 305 is configured to implement Equation (1) with suitable LIN and RIN weights, according to the function of the neuron 200. For example, the functions of neurons 2 and 3 (corresponding to the second and third columns, respectively, of FIG. 4) are to calculate the sum bit and the carry bit, respectively, of an adder. Neuron 2 has LIN weights having values of 1, 1, 1, and 2, and a threshold T equal to 3, and neuron 3 has LIN weights having values of 1, 1, 1, and 2, and a threshold T equal to 2. The LIN weights are shown, in the right-hand portion of FIG. 4, in the upper portions of the ellipses representing the neurons, and the thresholds (each of which may be implemented as a suitable RIN weight and a hard-wired RIN input) are shown in the lower portions of the ellipses. An inverter (which converts 0 to 1 and 1 to 0) is shown (represented by a small circle) connected in line with one of the inputs of neuron 2 (the sum neuron). The NPE fetches operands either from external inputs or the local registers 325 of two configurable processing circuits 305 (Neuron 1 and Neuron 4 in FIG. 4) in each cycle on a bit-by-bit basis. In the example, the NPE uses five cycles to implement a 4-bit addition. Finally, the NPE stores the result in the local register 325 of one of the neurons, which in this case is Neuron 2. The NPE has full control over which bits to add. For instance, the NPE can skip a few of the LSBs of the operands during addition. Doing so would lead to faster execution of the addition operation with better energy efficiency, but at the cost of accuracy. Similarly, the NPE may use n cycles to compare two n-bit operands, as shown in FIG. 5. The weights used for a comparison operation may be the same as those used for addition; as such, whether the NPE performs addition or comparison may be determined by scheduling, i.e., by the control signals sent to the NPE on the select lines for the multiplexers 320 and on the control lines controlling inversion at the outputs of the multiplexers 320. The oval shapes in FIGS. 4 and 5 represent operations advancing in time with intermediate and final results saved in local registers 325, represented by the accompanying rectangles. The final output of each operation may be written from the destination register to the DRAM. The average energy consumed by the NPE for 1-bit addition (in 1 cycle) is on the order of a few picojoules, which is much less than the energy that would be consumed by an equivalent architecture implemented using CMOS standard cells.

Figure 6A:
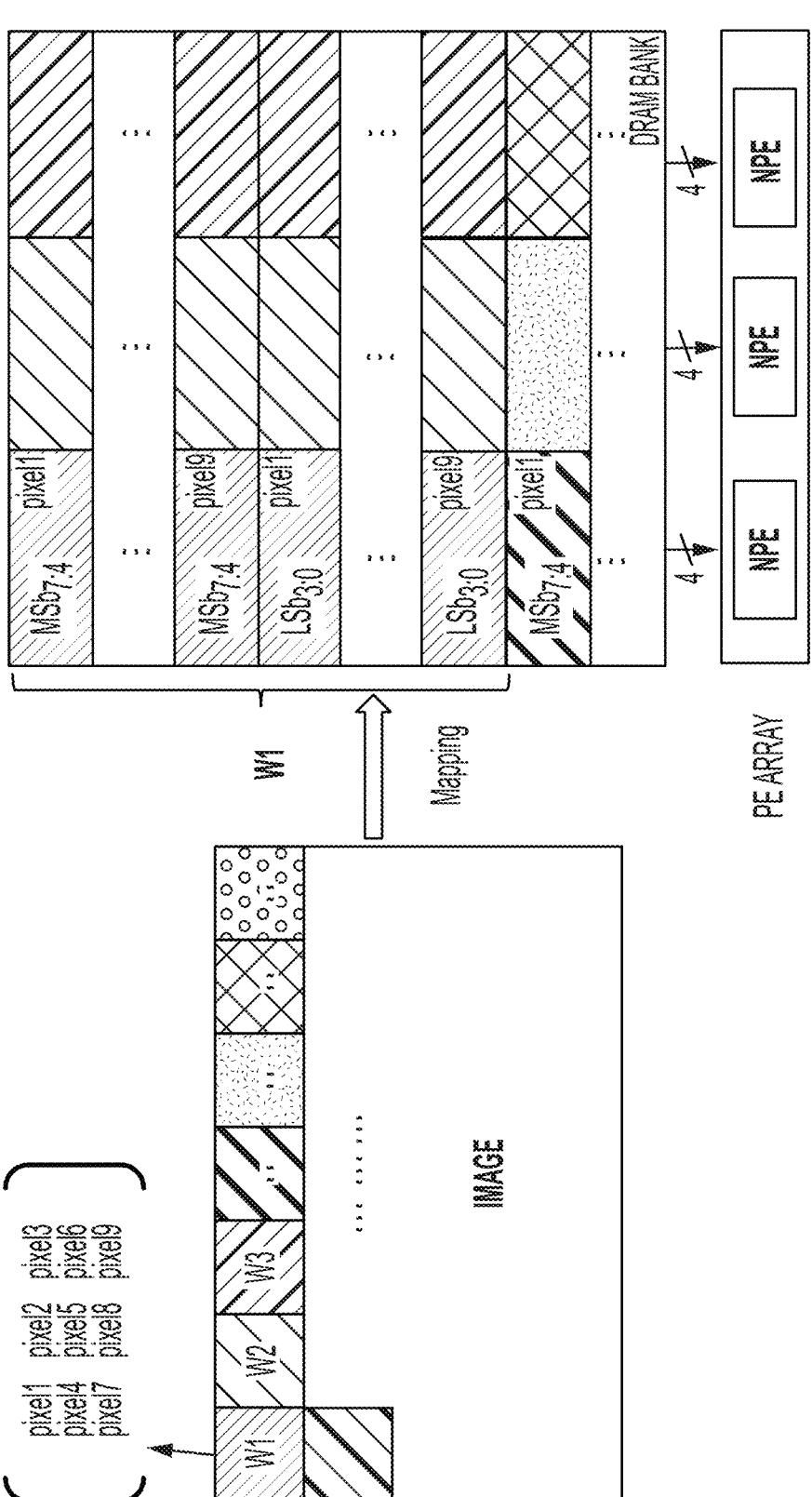
FIG. 6A is block diagram of a portion of a system for image processing, according to an embodiment of the present disclosure.

The type of memory used in the PiM architecture is, in some embodiments, dynamic random-access memory (DRAM), which is readily available and reliable. For example, a DDR4-2400 type memory, including a plurality of semiconductor (e.g., silicon) chips with a total capacity of 4 GB, may be used. Such a memory consists of 4 bank groups, with 4 banks in each group. All the banks within a bank group may share a PE-array. Each PE array has 2048 NPEs. Only one memory bank is active at a time, with input data written across all banks. FIG. 6A shows the interfacing of a memory bank with the PE array. The left-hand side of FIG. 6A shows an image including a plurality of 3×3 windows (the first three of which are labeled W1, W2, and W3). The first 3×3 window (labeled W1) may be stored in 18 consecutive 4-bit memory locations in the left-most column of the DRAM bank, with each of the 9 upper locations of the column storing the 4 most significant bits of a respective pixel of the window W1, and each of the next 9 (lower) locations of the column storing the 4 least significant bits of a respective pixel of the window W1. The second and third windows (labeled W2 and W3) are stored in an analogous manner in the second and third columns from the left of the DRAM bank. DRAM commands include activate (ACT), read (RD), write (WR), and precharge (PRE) operations. Applications may use a sequence of these commands to read operands to the PE-array and to write back the computed results to the DRAM bank.

An ACT command latches an entire row into the sense amplifier of the memory array. The PRE command prepares the bank for the next activation by charging the memory bitlines to a predefined value. Sense amplifiers share the output of the DRAM bank with the PE-array. Each bitline of the DRAM bank may be (i) connected to an input of an NPE and (ii) connected (through a multiplexer) to a data bus of the DRAM memory. In every array, there are 2048 NPEs, and each can operate on two 4-bit operands at a time. The input pixels of the 3×3 convolution window are written in the same column but in different rows. Several copies of each pixel value may be stored in the memory. Therefore, the computation of a 3×3 convolution of input image window (I) with a 3×3 filter (H) requires 9 ACT and 9 PRE commands to supply the pixels to the corresponding NPEs in the PE-arrays, and then a write (WR) command writes back the calculation result into the DRAM bank. This methodology helps to achieve high levels of throughput and energy efficiency. As a result, the PiM architecture can process large images, such as an 8K resolution image (where the total number of pixels in an image is in millions), with high speed and energy efficiency.

Gray-scale images are 8 bits per pixel where the 4 most significant bits (MSB) and the 4 least significant bits (LSB) of each pixel are stored in non-consecutive rows as shown in FIG. 6A, for reasons explained below. As every window computation is independent, the order or arrangement of windows does not matter as long as the output pixels are stored in the spatial hierarchy.

Several hardware-compatible approximation strategies may be used, based on the hardware described above, to achieve a fine-grained trade-off between accuracy, energy efficiency, and performance. Each pixel's four most significant bits (MSBs) and least significant bits (LSBs) are stored in separate rows of the DRAM. Many filters (such as a Gaussian filter) have a division factor (called the DC value of the filter) of $\frac{1}{16}$. Therefore, an NPE can neglect the four LSBs of all operands before computation starts. Doing so only incurs a negligible amount of error. Furthermore, storing LSBs and MSBs on separate rows makes it possible to skip the read operation for the LSBs, saving significant energy and improving the throughput of the overall computation. The table of FIG. 6B shows the notation used for functions used in approximation computing strategies of some embodiments. The NPE can schedule these functions on TulipA using a combination of local registers 325 and scheduling. The values returned by the functions are summed sequentially in the order of the schedule to give the final result. As such, an approximation policy is a custom schedule of k function calls where k is the number of input pixels $[7:0]x_{ij}$. LS($[N-1:0]x$, n) is the only function which returns x with increased bit-width. The other two functions return same bit-width as the input argument x.

Figure 7A:
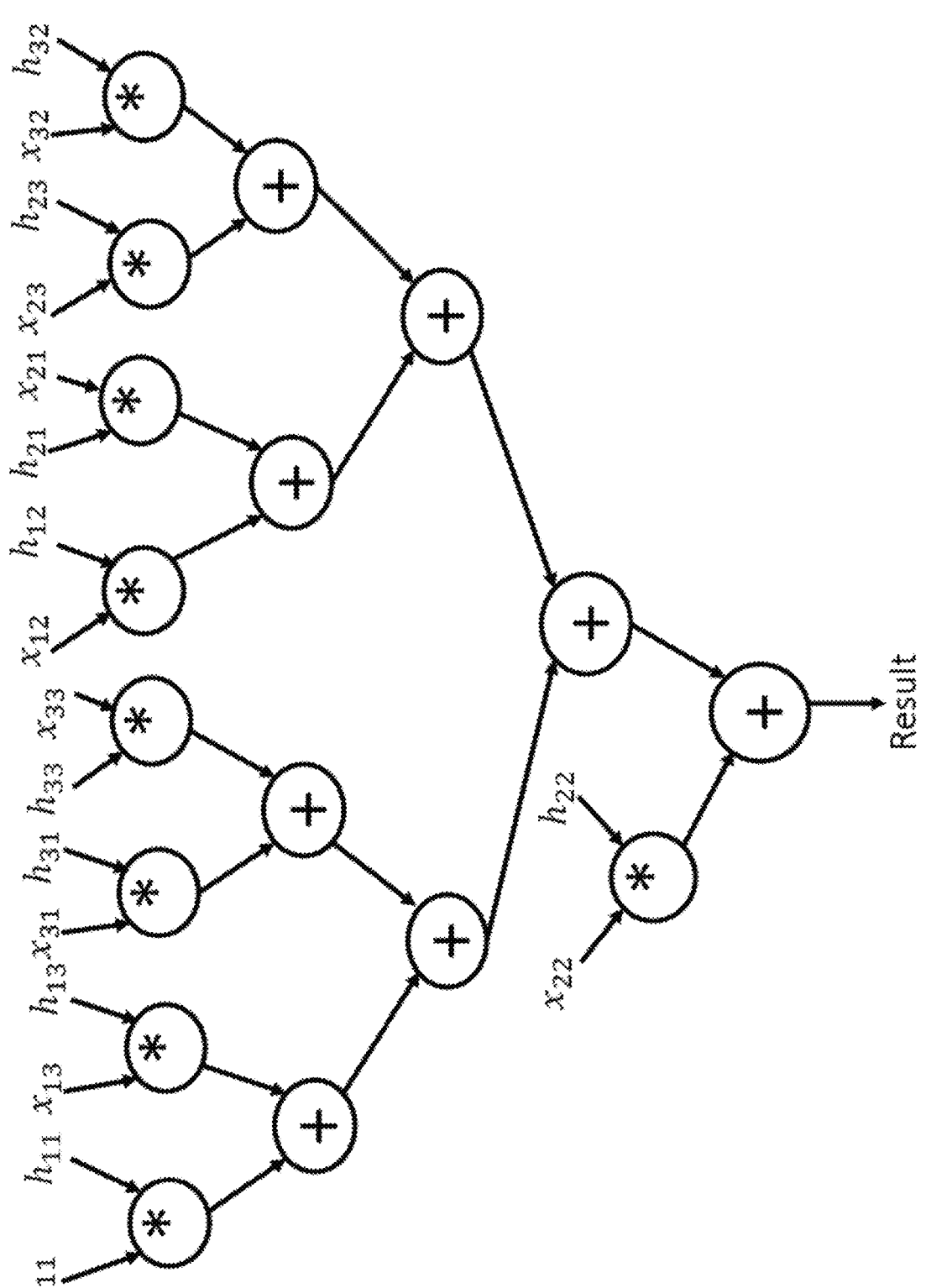
FIG. 7A is a compute graph, according to an embodiment of the present disclosure.

A controlled truncation (CT) strategy may be used, for a given PSNR, to truncate bits (or to zero n LSBs in some embodiments) from the operands in the computation graph of a 2-D convolution operation, as shown in FIG. 7A, such that the final output meets the minimum PSNR requirements. One NPE may perform all of the operations illustrated in FIG. 7A. The number of bits truncated from a pixel may depend on the corresponding weight $h_{ij}$ in the original computation graph. In some embodiments, the number of bits truncated may also (or instead) depend on the pixel value. Since each node in the computation graph represents an operation on specific bits of operands, truncating all bits of an operand is translated to pruning away a subgraph, which leads to better energy efficiency and performance when scheduling on the NPE. This method may be referred to as controlled truncation (CT). In some embodiments, the two operands $x_1$ and $x_2$ in the expression $w_1x_1+w_2x_2$, are each truncated by an equal number of bits, making it possible to reduce the computation cycles. In another embodiment, the operands $x_1$ and $x_2$ are checked, and then a more aggressive or compete truncation is performed on the lower-valued term. However, a better approach may be to check the operands $x_1$ and $x_2$ and then perform a more aggressive truncation on the operand with the smaller weight. Doing so leads to a better error percentage while still gaining the same energy-efficiency and performance gains.

As seen in FIG. 1, most of the 3×3 filters have single order values (e.g., are single digit values) and are in powers of 2. Multiplying a number by two or its exponent is relatively easy in hardware as it translates to left shifting the binary equivalent of the number. Therefore, exploring a combination of shifting bits and truncating different operands by varying degrees may be used to produce the best possible EPT for the given PSNR.

The 8-bit pixel values in a 3×3 input image matrix (I) may be denoted $[[7:0]x_{11}, [7:0]x_{12}, [7:0]x_{13}, \ldots, [7:0]x_{33}]$. The table of FIG. 7B shows delay, energy, energy-delay product (EDP) and average error values of 3×3 Gaussian filter for different approximation policies. The table of FIG. 7B shows that:

(1) Each approximation policy in the first column of the table constitutes passing input values in matrix I, $x_{11}$ to $x_{33}$, to one of the functions in the table of FIG. 6B with a corresponding value of n as the second argument, denoted by $n_{ij}$ for the input $x_{ij}$.

(2) The average error percentage (AEP) or average error rate is used as the error metric for quantitative analysis because the approximation strategies are generalized for a uniform distribution of data [0, 255] for grayscale images. Also, input image data (I) may be random in nature and therefore, PSNR is not used because it is specific to an input image. For example, the table of FIG. 8C uses the metric PSNR when the approximation strategies are applied to a 512×512 Lena Image. With the assumption that error is distributed uniformly across all 3×3 windows (I) sliding over the whole 512×512 input image, AEP is a function of PSNR as shown in the following equations, $$PSNR = 20 * \log_{10}(255 / AEP) \qquad (2)$$

$$AEP = 255 / 10^{(PSNR/20)} \qquad (3)$$

The MSBs of the pixel may be written $[7:4]x_{ij}$ and the LSBs of the pixel may be written $[3:0]x_{ij}$. For brevity, an approximation strategy such as Z($[7:4]x_{11}$, n), Z($[7:4]x_{13}$, n), Z($[7:4]x_{31}$, n), Z($[7:4]x_{33}$, n) is written as Z($[[7:4]x_{11}, x_{13}, x_{31}, x_{33},]$, n) in the tables of FIGS. 7B and 7C. In other words, 1) certain input pixels $x_{ij}$ with the same value for the adjoining $n_{ij}$ are written in the form of an array; 2) the bit-width of all pixels in a set is the same and therefore, bit-widths are omitted for all pixels except for the first pixel in the array, and, for unaltered (e.g., un-truncated) pixels to be added, the bit-width for the first one is specified and this bit-width is the same for the following pixels.

The first row in the table of FIG. 7B corresponds to the convolution of 3×3 matrix I and 3×3 filter matrix H using MSBs and LSBs of all the pixels and computing their weighted sum accurately. Subsequent rows correspond to using only the MSBs of the pixels due to the $\frac{1}{16}$ DC value for the Gaussian filter. This incurs a small error but reduces the energy required considerably as the total number of rows accessed is reduced by a factor of two, compared to the accurate computation. For example, the second row of the table of FIG. 7B has the total energy consumed by the PE array as 3.49 nJ and a delay of 4.99 us, whereas the accurate computation consumes 6.89 nJ and 9.86 us. The number of cycles, energy and latency on the NPE are saved as the truncation limit increases at the cost of accuracy. The pixel values are stored and scheduled in ascending order of their corresponding filter values. This data arrangement facilitates dynamic truncation (DT), i.e., every pixel is truncated differently depending on the weight of the pixel and the chosen policy for approximation. For example, for a Gaussian filter, the pixel with a weight of 4 may be scheduled and truncated at the end. This exploits spatial correlation and avoids sorting, an expensive operation. Dynamic truncation is most useful for cases where the operands are very different, e.g. at the edges of an image. For example, the last three rows in the table of FIG. 7B correspond to dynamic truncation, where different values truncate all 9 pixels with an increasing number of truncated bits. As used herein, "dynamic truncation" refers to processing in which the amount of truncation varies within the filter.

For the mean filter shown in FIG. 1B, the DC value is $\frac{1}{8}$. This value may be approximated as $\frac{1}{8}$. Dividing by 8, which is a right shift by 3 operation, requires 5-bit storage (MSBs) for the pixel. This may have a large impact on energy consumption. Since a single row stores 4 bits per pixel, storage of 5 bits would use two rows, which reduces the number of pixels stored in one row of a DRAM bank by 20% (from 2048). For example, if every MSB is 5 bits then as per the row size of the bank (in bits), two rows may be used instead of one to store 2048 operands. Therefore, the energy required to activate the DRAM rows in the case where each MSB is 5 bits, is double the energy required to activate the DRAM rows in the case where each MSB is 4 bits. Since there are 2048 PEs in the array, this would render 409 PEs inactive, reducing the throughput. It takes considerable energy to activate a row of a DRAM bank, and hence dividing by 8 can be quite wasteful of energy. On the other hand, dividing by 16, which is a right shift by 4, leads to a large cumulative error. As such, in some embodiments, a solution (which may be referred to as error compensation for division (ECD)) is to add an error compensation factor ($\varepsilon$) to the end result of the division by 16 to reduce the cumulative error. This is evident from second and third rows of the table of FIG. 7C, where all pixels are divided by 8 and 16 respectively. Although the number of cycles required is nearly the same in the two cases due to additional cycles required in the third row to add the compensation factor $\varepsilon$, the energy consumption is reduced by a factor of 2. This is due to the fact that the division by 16 is ignoring the LSBs, which reduces the row accesses per operand from 2 to 1.

The compensation factor $\varepsilon$ is a function of $d_1$ and $d_2$ (which are equal to 9 and 16 respectively for a mean filter) as shown in step 2 of Algorithm 1 (shown in FIG. 7D). For the mean filter, $\varepsilon=c$; therefore the approximation for $x/d_1$ is simply $2*c=2*x/d_2$, where $d_2$ is a power of 2 closest to $d_1$. This is also easily implemented by an NPE operation as $x/d_1 \approx LS(RS(x,d_2),1)$.

Figure 8A:
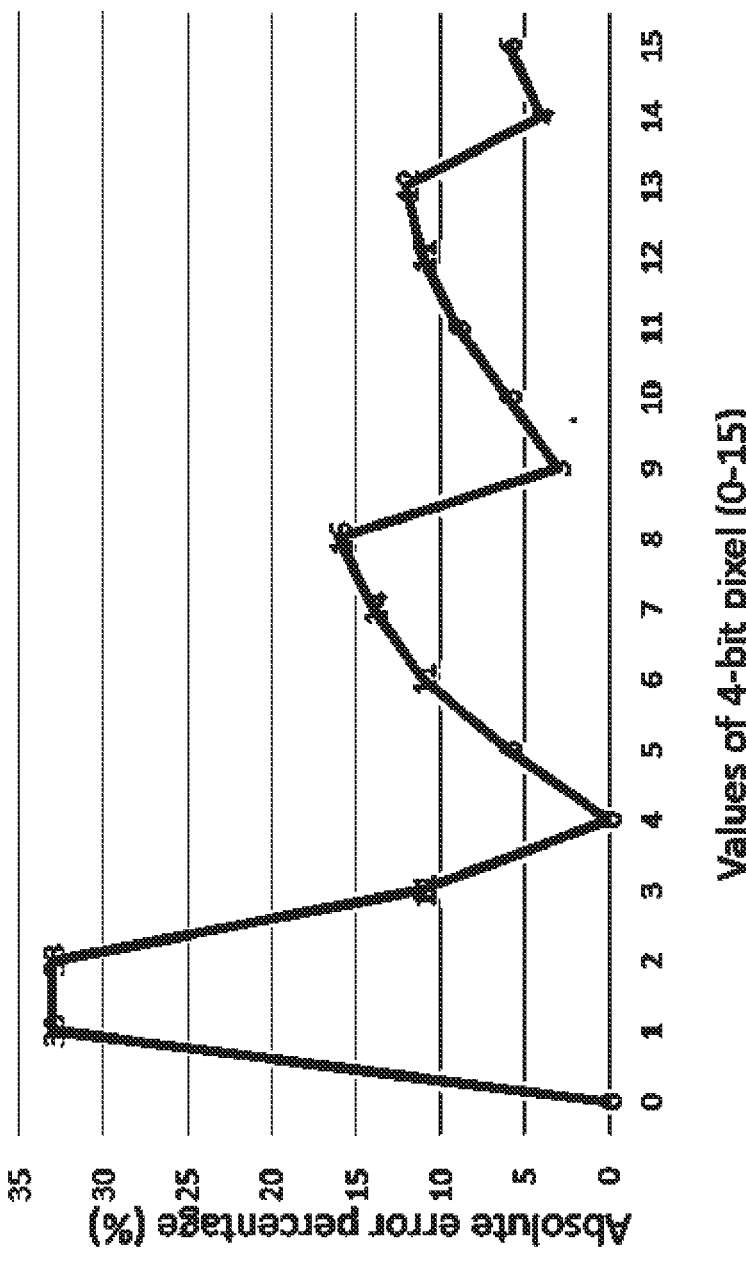
FIG. 8A is a graph of absolute error percentage, according to an embodiment of the present disclosure.

For a given PSNR, error compensation for multiplication (ECM) may be performed, with the objective of taking the approximated result of a multiplication operation and adjusting its value to meet the minimum PSNR requirements. This step may be referred to as error compensation (ECM) for multiplication, similar to the ECD approximation. For example, if a given pixel value x is to be multiplied by $m_1$ which is not a power of 2, then the approximation is $(x-\gamma)*m_2$, where $m_2$ is the closest power of 2 to $m_1$, and $\gamma$, which depends on x, $m_1$, and $m_2$, is computed as shown in Algorithm 2 (shown in FIG. 7E). This approximation may be preferred because subtraction (shown in FIG. 4) and comparison operations (shown in FIG. 5) can easily be scheduled on the NPE and multiplying a number with a power of 2 is simply a left-shift (LS) operation on the NPE. The simplicity of this approximation belies its value in significantly reducing the energy and delay. The average percentage error (AEP) of this approximation is shown in FIG. 8A for a Laplace filter (FIG. 1G). One approach is to decompose a 12× product operation into 4× and 8× and sum the two results at the end, requiring only shifts and addition. This approach repeated for 3×3 windows across the entire image incurs extra energy and delay expenditure which is around 15%-20%. Algorithm 2 exploits the fact that the input value x is limited in range due to the bit width of 4 in this case. Therefore in 4 comparison operations (shown in steps 1, 3, 5 and 7 of Algorithm 2) and 1 subtraction operation with a bias value $\gamma$, an approximate product is generated for 12×.

The comparisons shown in Algorithm 2 are performed by the NPEs for every 3×3 window which can amount to significant energy and delay in a worst-case scenario. This can be further reduced by exploiting the spatial correlation between the pixels in the overlapping windows of a real-time image. The methods to do this are referred to as Skipping (SK) and Bookkeeping (BK).

Skipping (SK). This strategy first calculates an approximated result (approxRes) for one window using Algorithm 2 and then uses that value for some number (say v) of neighboring windows, before it recalculates the value of approxRes for $(v+1)^{th}$ window. This value of v may be determined by an external agency during the pre-processing step of the image processing based on the nature of the input image. For example, a small value of v may be used for images with significant fine detail whereas a larger v may be used for relatively smooth images with few sharp edges. The importance of the strategy is realized when the parameter v is changed at run-time, without any changes to the hardware.

The strategy of skipping (SK) may provide substantial benefits when the value of v is large or, in other words, when the PSNR requirement for a frame is low. If the PSNR requirement by an external agency is increased substantially, it may be appropriate to decrease the value of v, which diminishes the advantage of the strategy of skipping.

Therefore, another strategy referred to as bookkeeping (BK) may be used for high PSNR requirements. In this strategy, all the comparisons in Algorithm 2 are performed for a reference window (RW). The valid comparison condition (the value of gamma) is saved in the local registers 325 of the PE and for the next neighboring window, the saved comparison condition is performed first. If x is not in the same range as it was for the previous window, then one or more adjacent ranges may be checked. This way the number of cycles expended on the comparison operations can be decreased. No comparison operations are skipped for a window until a valid comparison is found. As a result, the quality of the output image is better than the one produced using the strategy SK. This is evident from the table of FIG. 8C.

The in-memory computation architecture was evaluated using a combination of circuit-level simulations and system-level evaluations. First, the NPE was designed in TSMC 40 nm LP process technology. It was then synthesized using Cadence™ Genus™ tool, using a standard cell library of TSMC 40 nm LP technology and an in-house characterized standard cell library of the artificial neuron in the same technology node. Finally, the area, power, and energy numbers were obtained from the synthesis tool and scaled to DRAM technology.

A behavioral level simulator was developed in concert with DRAM-power to simulate the throughput and energy of various workloads on the PiM architecture. For a given workload, the simulator generates a DRAM trace in the format developed by Ramulator. Then, it simulates the operations on the PE arrays to compute the total latency, throughput, energy, and power of the entire image filtering application. Error models for different approximation strategies and PSNR values were generated in Python.

It may be useful to consider various convolution engines or PEs interfaced with the same memory setup to evaluate the overall performance of in-memory computing platforms. The first basis for comparison is an in-memory platform using multiply and accumulate (MAC) PEs against the in-memory platform (TulipA) for equal area occupied by the PE arrays as shown in the table of FIG. 8B. As the DRAM platform is the same for both the designs, both designs have a fixed area footprint. This limits the maximum area of the PE arrays that can be physically interfaced with DRAM. The PE array consists of 2048 NPEs in TulipA. The baseline MAC requires nearly 3 times as much area as an NPE. Also, it requires a 12-bit input (8 bits for gray-scale input pixel $x_{ij}$ and 4 bits for filter values $h_{ij}$ in a single cycle). Instead, the NPE only requires 4 bits of input pixels in each cycle. Therefore, the number of PEs computing simultaneously in the case of MAC units is one third of the 2048 NPEs. To convolve a 512×512 image with NPE array and MAC units, the number of rows to be accessed from DRAM banks are 1152 and 3460, respectively. The table of FIG. 8B shows the results of the comparison. Compared to a MAC-based in-memory platform, the PiM platform of some embodiments has better energy efficiency and throughput performance due to the lower number of memory accesses required in TulipA. The improvements are possible because TulipA only requires 4 bits of input pixel at a time. The kernels need not be stored on the DRAM for TulipA as they are realized through the NPE schedule. On the other hand, the MAC-based in-memory platform requires kernels to be stored in the memory rows alongside inputs.

The table of FIG. 8C shows PSNR, energy and delay values for various filters (Gaussian (G), mean (M), Laplacian (L) and Sobel(S)) for a grayscale 512×512 Lena Image. For every filter, various approximation policies are used to achieve different values for EPT. Experiments demonstrate that specific approximation policies are more suitable for a different set of EPT values than the others, and that other such configurations may result in other values of EPT. Only a few are included based on the standard EPT requirements of image filtering applications. Hence, these strategies can be scaled and varied for applications where the input operands size, range, and expected EPT are varied over a wide range during run-time. The switching between different approximation policies for various filters is easy due to the NPE design, allowing dynamic reconfigurability of the operation on the varied operand size.

The first row of the table of FIG. 8C uses a Gaussian filter on a 512×512 Lena image and employs the function $Z([[7:0]x_{11},x_{13}],1)$. All input values $x_{ij}$ are 8 bits. As the addition of only two bits is skipped, the PSNR value is high (60.22 dB). As per the 3rd row of the table of FIG. 8C, the 4 LSBs are ignored for all input values of $x_{ij}$ due to the 1/16 DC factor. The PSNR is reduced by a factor of 2 as compared to the first row, saving half of the energy and delay. Considering the two cases for the mean filter (M), using $\varepsilon$ (9, 16), i.e., $RS([7:0]x_{ij}, 4)$ for the first case gives more improvement in PSNR value while saving twice the energy and delay compared to the second case, i.e., $RS([7:0]x_{ij}, 3)$. For the Laplace filter (L), the PSNR is better for v=5 than v=3 while saving on energy and delay. EPT values for the first two cases for the Sobel filter (S) are more than for other filters as the two cases access the MSBs as well as the LSB. The last two cases access only the MSBs and therefore the energy and delay are significantly less than those for the first two cases of the Sobel filter. The use of these approximation policies depends on the type of image involved and, as such, the approximation policies may be adjusted according to the image being processed.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the word "or" is inclusive, so that, for example, "A or B" means any one of (i) A, (ii) B, and (iii) A and B.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

Although exemplary embodiments of a system and method for in-memory image processing have been specifically described and illustrated herein, many modifications and variations will be apparent to those skilled in the art. Accordingly, it is to be understood that a system and method for in-memory image processing constructed according to principles of this disclosure may be embodied other than as specifically described herein. The invention is also defined in the following claims, and equivalents thereof.

What is claimed is:

1. A system comprising:

a memory comprising a Dynamic Random Access Memory (DRAM);

a first neuron processing circuit; and a second neuron processing circuit, the first neuron processing circuit being connected to a first plurality of bit lines of the memory, the second neuron processing circuit being connected to a second plurality of bit lines of the memory, the first neuron processing circuit comprising a plurality of configurable processing circuits, each of the configurable processing circuits comprising:

an artificial neuron for calculating the sign of a weighted sum of a plurality of single-bit digital input signals at respective inputs of the artificial neuron, and

15 a plurality of multiplexers, each having an output connected to a respective input of the inputs of the artificial neuron, wherein:

the artificial neuron comprises:

a left input network (LIN) to calculate a first contribution to the weighted sum, the first contribution comprising a sum of terms with positive weights;

a right input network (RIN) to calculate a second contribution to the weighted sum, the second contribution comprising a sum of terms with negative weights;

a sense amplifier connected to the LIN and to the RIN; and a set-reset latch connected to the sense amplifier, the LIN comprises a first set of switchable current sources, each switchable current source of the first set of switchable current sources is configured:

to be switched on or off according to whether the value at a respective corresponding input of the LIN is a one or a zero; and to drive an output of the LIN, the RIN comprises a second set of switchable current sources, each switchable current source of the second set of switchable current sources is configured:

to be switched on or off according to whether the value at a respective corresponding input of the RIN is a one or a zero; and to drive an output of the RIN, and the DRAM and the first and second neuron processing circuits are in a same semiconductor chip.

2. The system of claim 1, wherein each of the configurable processing circuits of the first neuron processing circuit is connected to each of the other configurable processing circuits of the first neuron processing circuit.

3. The system of claim 1, wherein each of the configurable processing circuits of the first neuron processing circuit further comprises a register for storing one or more bits.

4. The system of claim 1, wherein the weighted sum is a weighted sum of four terms.

5. The system of claim 4, wherein the weights corresponding to the four terms are 1, 1, 1, and −2.

6. The system of claim 1, wherein the memory, the first neuron processing circuit, and the second neuron processing circuit are fabricated on a single semiconductor chip.

7. A system comprising:

a memory comprising a Dynamic Random Access Memory (DRAM);

a first neuron processing circuit; and a second neuron processing circuit, the first neuron processing circuit being connected to a first plurality of bit lines of the memory, the second neuron processing circuit being connected to a second plurality of bit lines of the memory, the first neuron processing circuit comprising:

a plurality of multiplexers and being configured to perform:

a multi-bit addition when the multiplexers receive a first set of control signals, and a multi-bit comparison when the multiplexers receive a second set of control signals, a plurality of configurable processing circuits, a first configurable processing circuit of the configurable processing circuits comprising:

an artificial neuron for calculating the sign of a weighted sum of a plurality of single-bit digital input signals at respective inputs of the artificial neuron, the artificial neuron comprising:

a left input network (LIN) to calculate a first contribution to the weighted sum, the first contribution comprising a sum of terms with positive weights;

a right input network (RIN) to calculate a second contribution to the weighted sum, the second contribution comprising a sum of terms with negative weights;

a sense amplifier connected to the LIN and to the RIN; and a set-reset latch connected to the sense amplifier, wherein the LIN comprises a first set of switchable current sources, wherein each switchable current source of the first set of switchable current sources is configured:

to be switched on or off according to whether the value at a respective corresponding input of the LIN is a one or a zero; and to drive an output of the LIN, wherein the RIN comprises a second set of switchable current sources, wherein each switchable current source of the second set of switchable current sources is configured:

to be switched on or off according to whether the value at a respective corresponding input of the RIN is a one or a zero; and to drive an output of the RIN, and wherein the DRAM and the first and second neuron processing circuits are in a same semiconductor chip.

8. The system of claim 7, wherein the first configurable processing circuit of the configurable processing circuits further comprising:

a plurality of the multiplexers of the first neuron processing circuit, each of the plurality of multiplexers of the first configurable processing circuit having an output connected to a respective input of the inputs of the artificial neuron.

9. The system of claim 8, wherein each of the configurable processing circuits of the first neuron processing circuit is connected to each of the other configurable processing circuits of the first neuron processing circuit.

10. The system of claim 8, wherein each of the configurable processing circuits of the first neuron processing circuit further comprises a register for storing one or more bits.

11. The system of claim 8, wherein the weighted sum is a weighted sum of four terms.

12. The system of claim 11, wherein the weights corresponding to the four terms are 1, 1, 1, and −2.

13. The system of claim 7, wherein the memory, the first neuron processing circuit, and the second neuron processing circuit are fabricated on a single semiconductor chip.

14. A method for computing, by a system, the system comprising:

a memory comprising a Dynamic Random Access Memory (DRAM);

a first neuron processing circuit; and a second neuron processing circuit, the first neuron processing circuit being connected to a first plurality of bit lines of the memory, the second neuron processing circuit being connected to a second plurality of bit lines of the memory, the first neuron processing circuit comprising a plurality of configurable processing circuits, a first configurable processing circuit of the configurable processing circuits comprising:

an artificial neuron for calculating the sign of a weighted sum of a plurality of single-bit digital input signals at respective inputs of the artificial neuron, and a plurality of multiplexers, each having an output connected to a respective input of the inputs of the artificial neuron, wherein:

the artificial neuron comprises:

a left input network (LIN) to calculate a first contribution to the weighted sum, the first contribution comprising a sum of terms with positive weights;

a right input network (RIN) to calculate a second contribution to the weighted sum, the second contribution comprising a sum of terms with negative weights;

a sense amplifier connected to the LIN and to the RIN; and a set-reset latch connected to the sense amplifier, the LIN comprises a first set of switchable current sources, each switchable current source of the first set of switchable current sources is configured:

to be switched on or off according to whether the value at a respective corresponding input of the LIN is a one or a zero; and to drive an output of the LIN, the RIN comprises a second set of switchable current sources, each switchable current source of the second set of switchable current sources is configured:

to be switched on or off according to whether the value at a respective corresponding input of the RIN is a one or a zero; and to drive an output of the RIN, and the method comprising:

applying a first sequence of control signals to the multiplexers of the first configurable processing circuit; and in response to the first sequence of control signals, calculating a sum, by the first configurable processing circuit, wherein the DRAM and the first and second neuron processing circuits are in a same semiconductor chip.

15. The method of claim 14, further comprising:

applying a second sequence of control signals to the multiplexers of the first configurable processing circuit; and in response to the first sequence of control signals, performing a comparison, by the first configurable processing circuit.

16. The method of claim 14, wherein the sum is a sum of:

a first binary integer, left-shifted by a first number of bit positions, and a second binary integer, left-shifted by a second number of bit positions, the second number of bit positions being different from the first number of bit positions.

17. The method of claim 16, further comprising forming the second binary integer as a subset of bits of a third binary integer.

18. The method of claim 14, further comprising calculating an approximate product of a first integer and a second integer, the calculating comprising:

subtracting a third integer from the first integer to form a difference, and left-shifting the difference by a first number of bit positions, wherein:

the third integer is determined based on the first integer;

the first number of bit positions is based on the second integer; and the left-shifting of the difference corresponds to multiplying the difference by a fourth integer, the fourth integer being the closest power of 2 to the second integer.

19. The method of claim 18, wherein the third integer is determined by:

determining that the first integer is within a first range of values, the first range of values being based on a previously performed comparison, and setting the third integer equal to a value associated with the first range of values.

20. The method of claim 14, wherein the memory, the first neuron processing circuit, and the second neuron processing circuit are fabricated on a single semiconductor chip.

* * * * *